US011589310B2

(12) United States Patent
Wu et al.

(10) Patent No.: US 11,589,310 B2
(45) Date of Patent: Feb. 21, 2023

(54) DISCONTINUOUS RECEPTION FOR MODE 1 SIDELINK

(71) Applicant: QUALCOMM Incorporated, San Diego, CA (US)

(72) Inventors: Zhibin Wu, Los Altos, CA (US); Hong Cheng, Basking Ridge, NJ (US); Kapil Gulati, Hillsborough, NJ (US); Sudhir Kumar Baghel, Hillsborough, NJ (US); Tien Viet Nguyen, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 16/947,596

(22) Filed: Aug. 7, 2020

(65) Prior Publication Data

US 2021/0051588 A1 Feb. 18, 2021

Related U.S. Application Data

(60) Provisional application No. 62/887,260, filed on Aug. 15, 2019.

(51) Int. Cl.
*H04W 52/02* (2009.01)
*H04W 56/00* (2009.01)
*H04W 28/02* (2009.01)
*H04W 76/28* (2018.01)

(52) U.S. Cl.
CPC ... *H04W 52/0235* (2013.01); *H04W 28/0278* (2013.01); *H04W 52/0212* (2013.01); *H04W 56/001* (2013.01); *H04W 76/28* (2018.02)

(58) Field of Classification Search
None
See application file for complete search history.

(56) References Cited

U.S. PATENT DOCUMENTS 11,197,134 B2 * 12/2021 Lee .................. H04W 52/0216
11,438,842 B2 * 9/2022 Zhao .................... H04W 8/005
(Continued)

FOREIGN PATENT DOCUMENTS

EP          3522647 A1    8/2019
WO       2018064477 A1    4/2018

OTHER PUBLICATIONS

International Search Report and Written Opinion—PCT/US2020/070387—ISA/EPO—dated Dec. 22, 2020.
(Continued)

*Primary Examiner* — Jutai Kao
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station (BS), an indication of an access link discontinuous reception (DRX) configuration and a sidelink DRX configuration. The access link DRX configuration and the sidelink DRX configuration may synchronize access link DRX operation and sidelink DRX operation of the UE. The UE may perform access link communication with the BS based at least in part on the access link DRX configuration and/or may perform sidelink communication with another UE based at least in part on the sidelink DRX configuration. Numerous other aspects are provided.

24 Claims, 14 Drawing Sheets

(56) References Cited

U.S. PATENT DOCUMENTS

| | | | | |
|---|---|---|---|---|
| 2015/0055532 | A1* | 2/2015 | Lu | H04W 76/14 |
| | | | | 370/311 |
| 2017/0230815 | A1* | 8/2017 | Yasukawa | H04W 52/02 |
| 2019/0141546 | A1 | 5/2019 | Zhou et al. | |
| 2019/0207662 | A1 | 7/2019 | Zhou et al. | |
| 2019/0215888 | A1 | 7/2019 | Cirik et al. | |
| 2020/0314959 | A1* | 10/2020 | Agiwal | H04W 92/18 |
| 2020/0344722 | A1* | 10/2020 | He | H04W 4/46 |
| 2021/0037468 | A1* | 2/2021 | Huang | H04W 76/28 |
| 2022/0232523 | A1* | 7/2022 | Lee | H04L 1/1887 |

OTHER PUBLICATIONS

Partial International Search Report—PCT/US2020/070387—ISA/EPO—dated Oct. 29, 2020.

\* cited by examiner

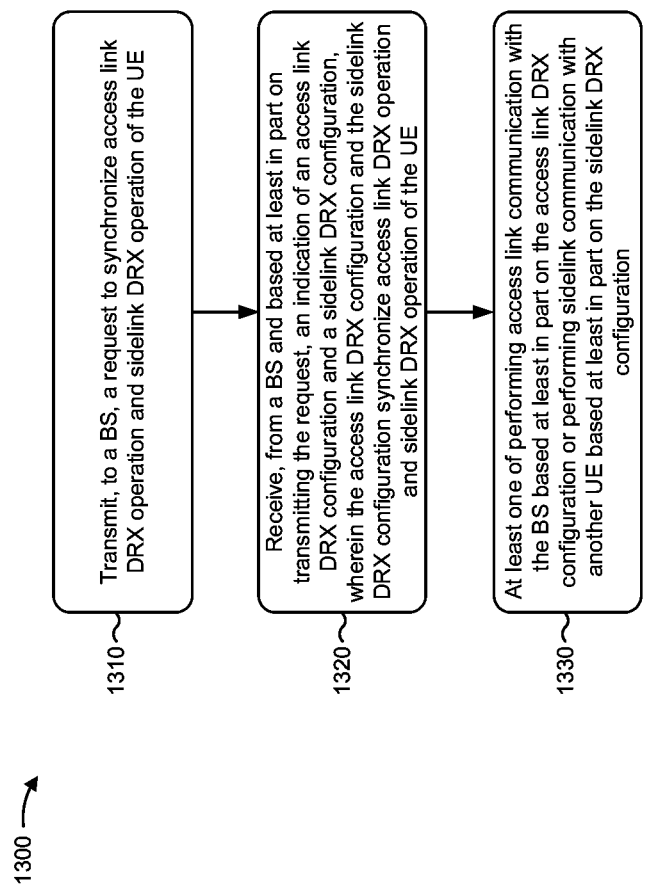

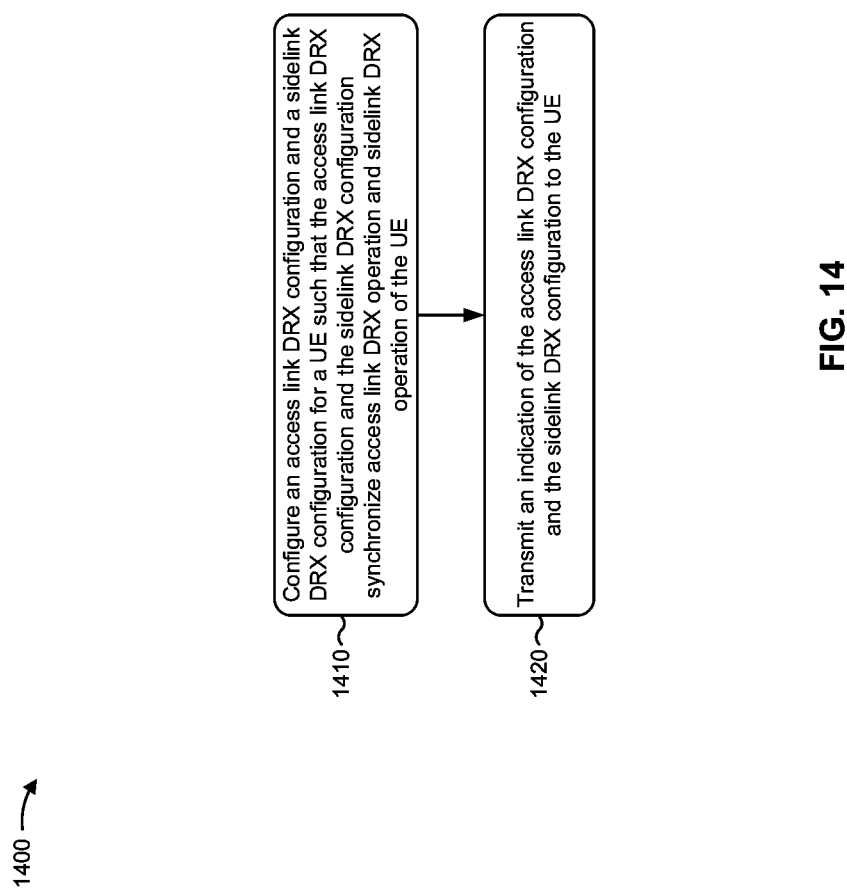

DISCONTINUOUS RECEPTION FOR MODE 1 SIDELINK

CROSS-REFERENCE TO RELATED APPLICATION

This patent application claims priority to U.S. Provisional Patent Application No. 62/887,260, filed on Aug. 15, 2019, entitled "DISCONTINUOUS RECEPTION FOR MODE 1 SIDELINK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for discontinuous reception (DRX) operation for mode 1 sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a sidelink configured grant from a base station on an access link; transitioning to an idle mode or an inactive mode on the access link after receiving the sidelink configured grant; and communicating, using the sidelink configured grant, on a sidelink with another UE while in the idle mode or the inactive mode on the access link.

In some aspects, a method of wireless communication, performed by a UE, may include transmitting, to a BS and when requesting a sidelink communication grant, an indication to suspend an inactivity timer; receiving, from the BS and based at least in part on transmitting the indication, a sidelink configured grant from a base station on an access link; and suspending, based at least in part on receiving the sidelink configured grant with the suspending indication, an access link inactivity timer such that the UE refrains from transitioning to an idle mode or an inactive mode on the access link.

In some aspects, a method of wireless communication, performed by a UE, may include transmitting, to a BS, a request for radio resources for transmitting a sidelink communication to another UE on a sidelink; and receiving, from the BS and based at least in part on transmitting the request for radio resources, an indication of a timing for retransmitting the request for radio resources to the BS, wherein the indication of the timing is based at least in part on the other UE being in a sidelink discontinuous reception sleep mode.

In some aspects, a method of wireless communication, performed by a BS, may include receiving, from a first UE, a request for radio resources for transmitting a sidelink communication to a second UE on a sidelink; determining that the second UE is in a sidelink discontinuous reception (DRX) sleep mode; and transmitting, to the first UE and based at least in part on determining that the second UE is in the sidelink DRX sleep mode, an indication of a timing for retransmitting the request for radio resources to the BS or an indication of a sidelink grant for a time period when the second UE is no longer in the sidelink DRX sleep mode.

In some aspects, a method of wireless communication, performed by a UE, may include transmitting, to a BS, a request to synchronize access link DRX operation and sidelink DRX operation of the UE; receiving, from the BS and based at least in part on transmitting the request, an indication of an access link DRX configuration and a sidelink DRX configuration, wherein the access link DRX configuration and the sidelink DRX configuration synchronize access link DRX operation and sidelink DRX operation of the UE; and at least one of performing access link communication with the BS based at least in part on the access link DRX configuration, or performing sidelink communication with another UE based at least in part on the sidelink DRX configuration.

In some aspects, a method of wireless communication, performed by a BS, may include configuring an access link DRX configuration and a sidelink DRX configuration for a UE such that the access link DRX configuration and the sidelink DRX configuration synchronize access link DRX operation and sidelink DRX operation of the UE; and transmitting an indication of the access link DRX configuration and the sidelink DRX configuration to the UE.

In some aspects, a UE for wireless communication may include memory and one or more processors operatively coupled to the memory. The memory and the one or more processors may be configured to receive a sidelink configured grant from a base station on an access link; transition to an idle mode or an inactive mode on the access link after receiving the sidelink configured grant; and communicate, using the sidelink configured grant, on a sidelink with another UE while in the idle mode or the inactive mode on the access link.

In some aspects, a UE for wireless communication may include memory and one or more processors operatively coupled to the memory. The memory and the one or more processors may be configured to transmit, to a BS and when requesting a sidelink communication grant, an indication to suspend an inactivity timer; receive, from the BS and based at least in part on transmitting the indication, a sidelink configured grant from a base station on an access link; and suspend, based at least in part on receiving the sidelink configured grant with the suspending indication, an access link inactivity timer such that the UE refrains from transitioning to an idle mode or an inactive mode on the access link.

In some aspects, a UE for wireless communication may include memory and one or more processors operatively coupled to the memory. The memory and the one or more processors may be configured to transmit, to a BS, a request for radio resources for transmitting a sidelink communication to another UE on a sidelink; and receive, from the BS and based at least in part on transmitting the request for radio resources, an indication of a timing for retransmitting the request for radio resources to the BS, wherein the indication of the timing is based at least in part on the other UE being in a sidelink discontinuous reception sleep mode.

In some aspects, a BS for wireless communication may include memory and one or more processors operatively coupled to the memory. The memory and the one or more processors may be configured to receive, from a first UE, a request for radio resources for transmitting a sidelink communication to a second UE on a sidelink; determine that the second UE is in a sidelink DRX sleep mode; and transmit, to the first UE and based at least in part on determining that the second UE is in the sidelink DRX sleep mode, an indication of a timing for retransmitting the request for radio resources to the BS or an indication of a sidelink grant for a time period when the second UE is no longer in the sidelink DRX sleep mode.

In some aspects, a UE for wireless communication may include memory and one or more processors operatively coupled to the memory. The memory and the one or more processors may be configured to transmit, to a BS, a request to synchronize access link DRX operation and sidelink DRX operation of the UE; receive, from a BS and based at least in part on transmitting the request, an indication of an access link DRX configuration and a sidelink DRX configuration, wherein the access link DRX configuration and the sidelink DRX configuration synchronize access link DRX operation and sidelink DRX operation of the UE; and at least one of perform access link communication with the BS based at least in part on the access link DRX configuration, or perform sidelink communication with another UE based at least in part on the sidelink DRX configuration.

In some aspects, a BS for wireless communication may include memory and one or more processors operatively coupled to the memory. The memory and the one or more processors may be configured to configure an access link DRX configuration and a sidelink DRX configuration for a UE such that the access link DRX configuration and the sidelink DRX configuration synchronize access link DRX operation and sidelink DRX operation of the UE; and transmit an indication of the access link DRX configuration and the sidelink DRX configuration to the UE.

In some aspects, a non-transitory computer-readable medium may store one or more instructions for wireless communication. The one or more instructions, when executed by one or more processors of a UE, may cause the one or more processors to receive a sidelink configured grant from a BS on an access link; transition to an idle mode or an inactive mode on the access link after receiving the sidelink configured grant; and communicate, using the sidelink configured grant, on a sidelink with another UE while in the idle mode or the inactive mode on the access link.

In some aspects, a non-transitory computer-readable medium may store one or more instructions for wireless communication. The one or more instructions, when executed by one or more processors of a UE, may cause the one or more processors to transmit, to a BS and when requesting a sidelink communication grant, an indication to suspend an inactivity timer; receive, from the BS and based at least in part on transmitting the indication, a sidelink configured grant from a base station on an access link; and suspend, based at least in part on receiving the sidelink configured grant with the suspending indication, an access link inactivity timer such that the UE refrains from transitioning to an idle mode or an inactive mode on the access link.

In some aspects, a non-transitory computer-readable medium may store one or more instructions for wireless communication. The one or more instructions, when executed by one or more processors of a UE, may cause the one or more processors to transmit, to a BS, a request for radio resources for transmitting a sidelink communication to another UE on a sidelink; and receive, from the BS and based at least in part on transmitting the request for radio resources, an indication of a timing for retransmitting the request for radio resources to the BS, wherein the indication of the timing is based at least in part on the other UE being in a sidelink discontinuous reception sleep mode.

In some aspects, a non-transitory computer-readable medium may store one or more instructions for wireless communication. The one or more instructions, when executed by one or more processors of a BS, may cause the one or more processors to receive, from a first UE, a request for radio resources for transmitting a sidelink communication to a second UE on a sidelink; determine that the second UE is in a sidelink DRX sleep mode; and transmit, to the first UE and based at least in part on determining that the second UE is in the sidelink DRX sleep mode, an indication of a timing for retransmitting the request for radio resources to the BS or an indication of a sidelink grant for a time period when the second UE is no longer in the sidelink DRX sleep mode.

In some aspects, a non-transitory computer-readable medium may store one or more instructions for wireless communication. The one or more instructions, when executed by one or more processors of a UE, may cause the one or more processors to transmit, to a BS, a request to synchronize access link DRX operation and sidelink DRX operation of the UE; receive, from a BS and based at least in part on transmitting the request, an indication of an access link DRX configuration and a sidelink DRX configuration, wherein the access link DRX configuration and the sidelink DRX configuration synchronize access link DRX operation and sidelink DRX operation of the UE; and at least one of perform access link communication with the BS based at least in part on the access link DRX configuration, or perform sidelink communication with another UE based at least in part on the sidelink DRX configuration.

In some aspects, a non-transitory computer-readable medium may store one or more instructions for wireless communication. The one or more instructions, when executed by one or more processors of a BS, may cause the one or more processors to configure an access link DRX configuration and a sidelink DRX configuration for a UE such that the access link DRX configuration and the sidelink DRX configuration synchronize access link DRX operation and sidelink DRX operation of the UE; and transmit an indication of the access link DRX configuration and the sidelink DRX configuration to the UE.

In some aspects, an apparatus for wireless communication may include means for receiving a sidelink configured grant from a base station on an access link; means for transitioning to an idle mode or an inactive mode on the access link after receiving the sidelink configured grant; and means for communicating, using the sidelink configured grant, on a sidelink with another apparatus while in the idle mode or the inactive mode on the access link.

In some aspects, an apparatus for wireless communication may include means for transmitting, to a BS and when requesting a sidelink communication grant, an indication to suspend an inactivity timer; means for receiving, from the BS and based at least in part on transmitting the indication, a sidelink configured grant from a base station on an access link; and means for suspending, based at least in part on receiving the sidelink configured grant with the suspending indication, an access link inactivity timer such that the apparatus refrains from transitioning to an idle mode or an inactive mode on the access link.

In some aspects, an apparatus for wireless communication may include means for transmitting, to a BS, a request for radio resources for transmitting a sidelink communication to another apparatus on a sidelink; and means for receiving, from the BS and based at least in part on transmitting the request for radio resources, an indication of a timing for retransmitting the request for radio resources to the BS, wherein the indication of the timing is based at least in part on the other apparatus being in a sidelink discontinuous reception sleep mode.

In some aspects, an apparatus for wireless communication may include means for receiving, from a first UE, a request for radio resources for transmitting a sidelink communication to a second UE on a sidelink; means for determining that the second UE is in a sidelink DRX sleep mode; and means for transmitting, to the first UE and based at least in part on determining that the second UE is in the sidelink DRX sleep mode, an indication of a timing for retransmitting the request for radio resources to the apparatus or an indication of a sidelink grant for a time period when the second UE is no longer in the sidelink DRX sleep mode.

In some aspects, an apparatus for wireless communication may include means for transmitting, to a BS, a request to synchronize access link DRX operation and sidelink DRX operation of the apparatus; means for receiving, from the BS and based at least in part on transmitting the request, an indication of an access link DRX configuration and a sidelink DRX configuration, wherein the access link DRX configuration and the sidelink DRX configuration synchronize access link DRX operation and sidelink DRX operation of the apparatus; and at least one of means for performing access link communication with the BS based at least in part on the access link DRX configuration, or means for performing sidelink communication with another apparatus based at least in part on the sidelink DRX configuration.

In some aspects, an apparatus for wireless communication may include means for configuring an access link DRX configuration and a sidelink DRX configuration for a UE such that the access link DRX configuration and the sidelink DRX configuration synchronize access link DRX operation and sidelink DRX operation of the UE; and means for transmitting an indication of the access link DRX configuration and the sidelink DRX configuration to the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 13 is a diagram illustrating an example process performed, for example, by a UE, in accordance with various aspects of the present disclosure.

FIG. 14 is a diagram illustrating an example process performed, for example, by a BS, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
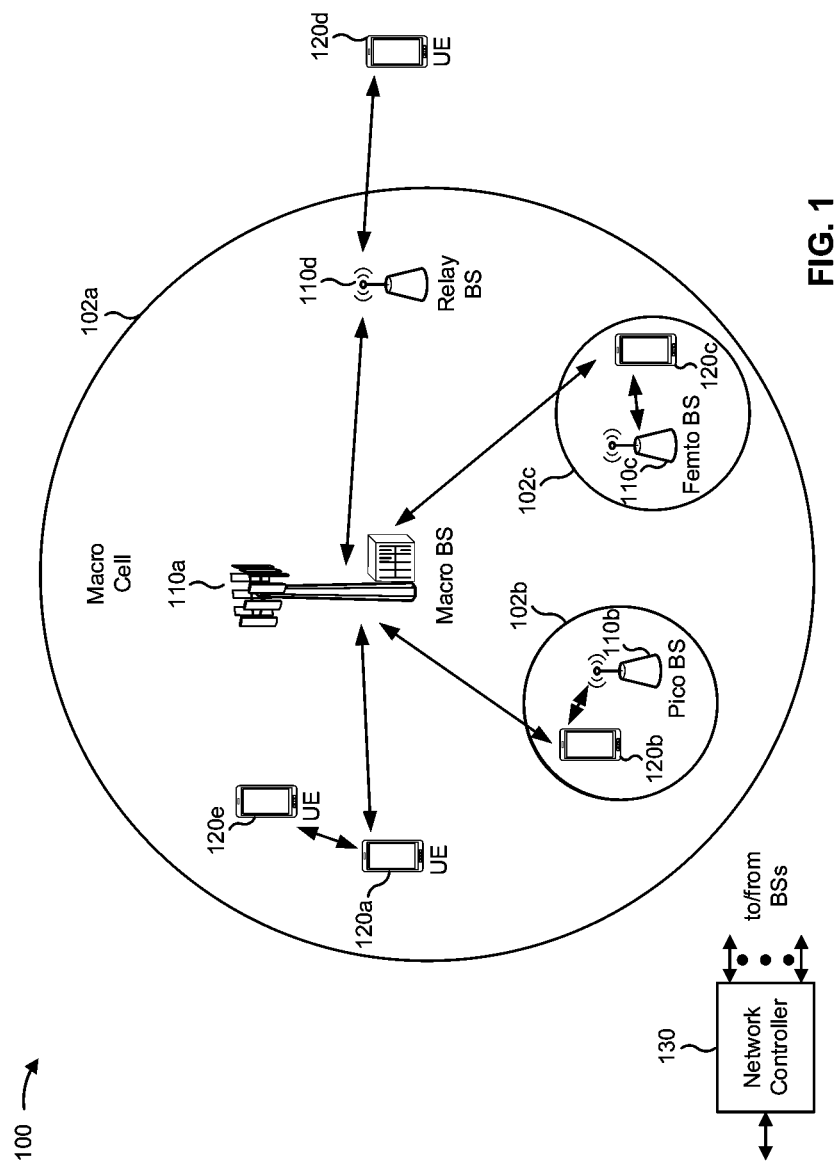
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
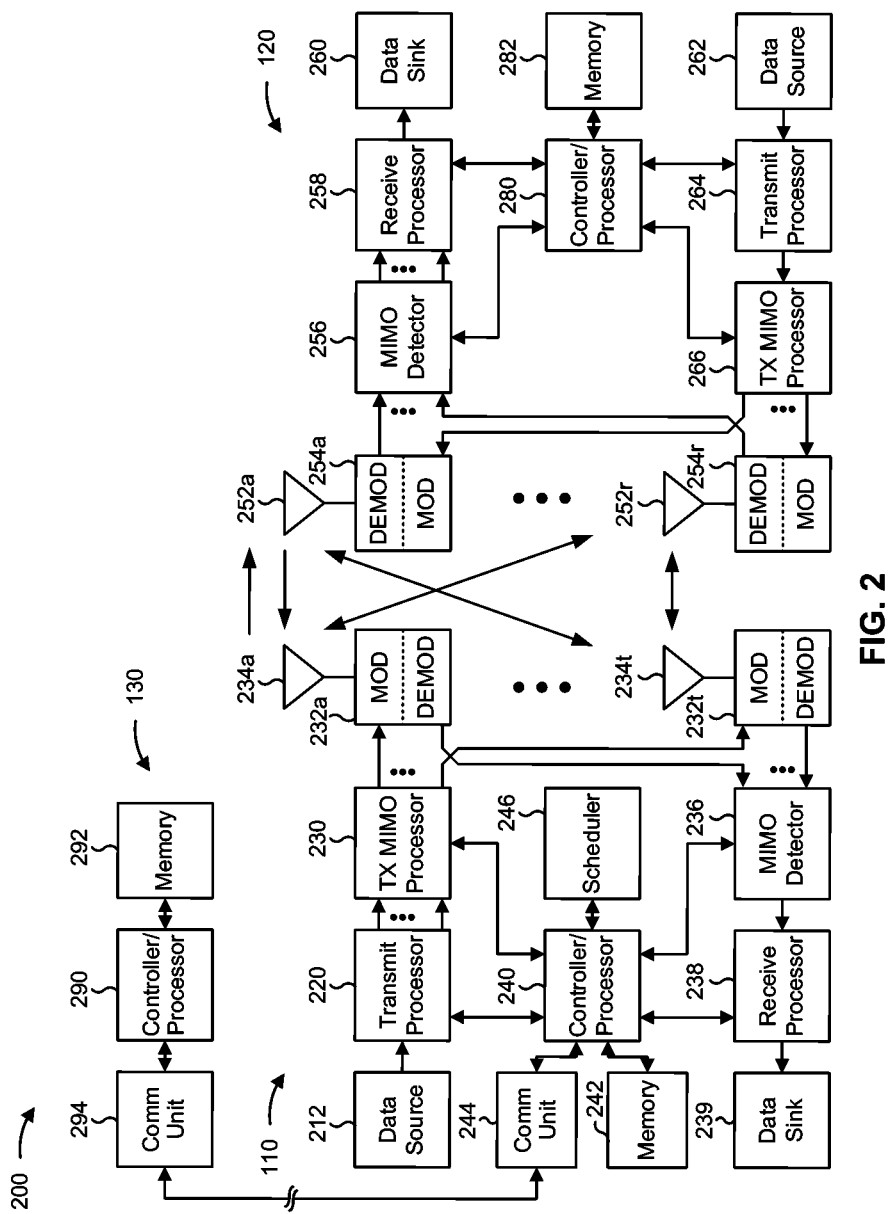
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with discontinuous reception (DRX) operation for mode 1 sidelink, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, process 1200 of FIG. 12, process 1300 of FIG. 13, process 1400 of FIG. 14, and/or other processes as described herein. A scheduler 246 may schedule UEs for data transmission on the downlink and/or uplink.

In some aspects, UE 120 may include means for receiving a sidelink configured grant from a base station on an access link, means for transitioning to an idle mode or an inactive mode on the access link after receiving the sidelink configured grant, means for communicating, using the sidelink configured grant, on a sidelink with another UE 120 while in the idle mode or the inactive mode on the access link, and/or the like. In some aspects, UE 120 may include means for transmitting, to a BS 110 and when requesting a sidelink communication grant, an indication to suspend an inactivity timer, means for receiving, from the BS 110 and based at least in part on transmitting the indication, a sidelink configured grant from a base station on an access link, means for suspending, based at least in part on receiving the sidelink configured grant with the suspending indication, an access link inactivity timer such that the UE 120 refrains from transitioning to an idle mode or an inactive mode on the access link, and/or the like. In some aspects, UE 120 may include means for transmitting, to a BS 110, a request for radio resources for transmitting a sidelink communication to another UE 120 on a sidelink, means for receiving, from the BS 110 and based at least in part on transmitting the request for radio resources, an indication of a timing for retransmitting the request for radio resources to the BS 110, wherein the indication of the timing is based at least in part on the other UE 120 being in a sidelink discontinuous reception sleep mode, and/or the like. In some aspects, UE 120 may include means for transmitting, to a BS 110, a request to synchronize access link DRX operation and sidelink DRX operation of the UE, means for receiving, from the BS 110 and based at least in part on transmitting the request, an indication of an access link DRX configuration and a sidelink DRX configuration, wherein the access link DRX configuration and the sidelink DRX configuration synchronize access link DRX operation and sidelink DRX operation of the UE 120, means for at least one of performing access link communication with the BS 110 based at least in part on the access link DRX configuration or performing sidelink communication with another UE 120 based at least in part on the sidelink DRX configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for receiving, from a first UE 120, a request for radio resources for transmitting a sidelink communication to a second UE 120 on a sidelink, means for determining that the second UE 120 is in a sidelink DRX sleep mode, means for transmitting, to the first UE 120 and based at least in part on determining that the second UE 120 is in the sidelink DRX sleep mode, an indication of a timing for retransmitting the request for radio resources to the BS 110 or an indication of a sidelink grant for a time period when the second UE 120 is no longer in the sidelink DRX sleep mode, and/or the like. In some aspects, BS 110 may include means for configuring an access link DRX configuration and a sidelink DRX configuration for a UE 120 such that the access link DRX configuration and the sidelink DRX configuration synchronize access link DRX operation and sidelink DRX operation of the UE 120, means for transmitting an indication of the access link DRX configuration and the sidelink DRX configuration to the UE 120, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
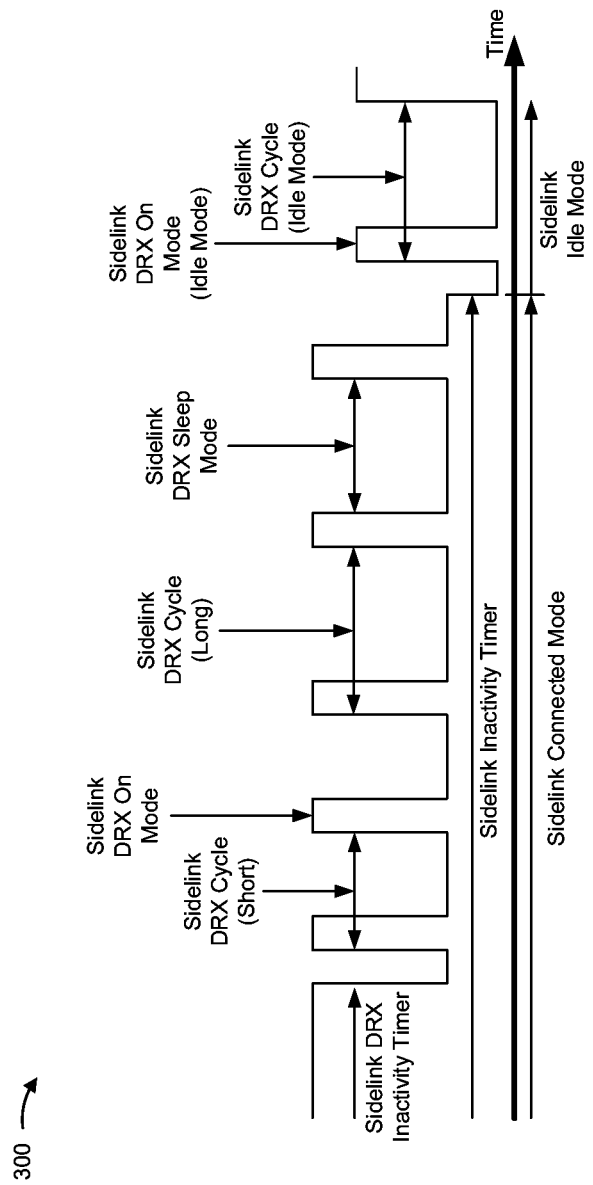
FIG. 3 is a diagram illustrating one or more examples of sidelink discontinuous reception (DRX) operation, in accordance with various aspects of the present disclosure.

FIG. 3 is a diagram illustrating one or more examples 300 of sidelink DRX operation, in accordance with various aspects of the present disclosure. In some cases, a UE may perform DRX operation for an access link between the UE and a BS, to conserve battery life of the UE. DRX operation may include transitioning to a DRX sleep mode for a DRX sleep duration. In the DRX sleep mode, the UE may refrain from transmitting or receiving on the access link, may deactivate particular subcarriers or component carriers (e.g., if carrier aggregation is implemented on the access link) of the access link, may deactivate one or more components of the UE, and/or the like. Moreover, DRX operation may include periodically transitioning out of the DRX sleep mode and into a DRX on mode (or activate mode) for a DRX on duration to monitor for downlink communications from a BS. In some cases, the BS may transmit an instruction to the UE to perform DRX operation, to transition to a DRX sleep mode, and/or the like.

In some cases, a UE may be configured to communicate with another UE (or an integrated access and backhaul (IAB) node may be configured to communicate with another IAB node) over a sidelink, which may be referred to as sidelink communication. In some cases, a UE may be configured to perform DRX operation on the sidelink. Example(s) 300 may illustrate an example of sidelink DRX operation of a UE (e.g., UE 120). Other examples of configurations may be used for sidelink DRX operation of a UE.

As shown in FIG. 3, the UE may perform sidelink DRX operation in various sidelink connectivity modes, such as a sidelink connected mode (e.g., a radio resource control (RRC) connected mode on one or more sidelinks) and a sidelink idle mode (e.g., an RRC idle mode). In some aspects, the UE may perform sidelink DRX operation in other sidelink connectivity modes, such as a sidelink inactive mode (e.g., an RRC inactive mode on one or more sidelinks), and/or the like.

As further shown in FIG. 3, the UE may initiate sidelink DRX operation based at least in part on expiration of a sidelink DRX inactivity timer. In some aspects, the UE may initiate sidelink DRX operation prior to expiration of the sidelink DRX inactivity timer, such as based at least in part on expiration of a sidelink inactivity timer (e.g., which may cause the UE to transition from the sidelink connected mode to the sidelink idle mode), based at least in part on operation of another UE, and/or the like.

In some aspects, the UE may determine whether the sidelink DRX inactivity timer is expired based at least in part on a time duration since the UE last transmitted and/or received a sidelink communication. For example, the UE may determine that the sidelink DRX inactivity timer has expired based at least in part on not transmitting and/or receiving a sidelink communication during the time duration, based at least in part on transmitting and/or receiving a quantity of sidelink communications, during the time duration, that does not satisfy a threshold quantity, and/or the like.

Similarly, the UE may determine whether the sidelink inactivity timer is expired based at least in part on a time duration since the UE last transmitted and/or received a sidelink communication. The time duration associated with the sidelink inactivity timer may be different (e.g., longer) relative to the time duration associated with the sidelink DRX inactivity timer. For example, the UE may determine that the sidelink inactivity timer has expired based at least in part on not transmitting and/or receiving a sidelink communication during the time duration, based at least in part on transmitting and/or receiving a quantity of sidelink communications, during the time duration, that does not satisfy a threshold quantity, and/or the like.

As further shown in FIG. 3, the UE may perform sidelink DRX operation based at least in part on a sidelink DRX cycle. The sidelink DRX cycle may include a combination of a sidelink DRX on mode and a sidelink DRX sleep mode. The UE may operate in the sidelink DRX sleep mode for a sidelink DRX sleep duration. In the sidelink DRX sleep mode, the UE may refrain from transmitting or receiving on the sidelink, may deactivate particular subcarriers or component carriers (e.g., if carrier aggregation is implemented on the sidelink) of the sidelink, may deactivate one or more components of the UE, and/or the like. Moreover, the UE may operate in the sidelink DRX on mode for a sidelink DRX on duration to monitor for sidelink communications from other UEs, to transmit sidelink communications to other UEs, and/or the like. The combination of the sidelink DRX sleep duration and the sidelink DRX on duration may be referred to as the sidelink DRX cycle duration of the sidelink DRX cycle. On the other hand, a UE in a sidelink DRX sleep mode may be active on an access link for transmission and reception. The UE may also use the sidelink for other purposes, such as additional measurement and/or testing.

As further shown in FIG. 3, the sidelink DRX operation of the UE may include various types of sidelink DRX cycles, such as a short sidelink DRX cycle, a long sidelink DRX cycle, and/or the like. The sidelink DRX cycle duration of the short sidelink DRX cycle may be shorter relative to the sidelink DRX cycle duration of the long sidelink DRX cycle. As an example, a short DRX cycle duration may be 5 subframes and a long DRX cycle duration may be 10 subframes. In some aspects, the UE may transition from short sidelink DRX cycles to long sidelink DRX cycles based at least in part on not transmitting and/or receiving sidelink communications in a particular quantity of consecutive sidelink DRX on mode durations.

In some aspects, the sidelink DRX cycle duration, the sidelink DRX on duration, and/or the sidelink DRX sleep duration of the sidelink DRX operation of the UE may be the same or different between the sidelink connected mode and the sidelink idle mode. For example, the sidelink DRX sleep mode duration may be longer in the sidelink idle mode relative to the sidelink connected mode, in which case fewer sidelink DRX on durations may be scheduled for a given time period in the sidelink idle mode relative to the sidelink connected mode.

As indicated above, FIG. 3 is provided as one or more examples. Other examples may differ from what is described with respect to FIG. 3.

In some cases, a serving BS of a UE may schedule access link communication on an access link between the BS and the UE, may schedule sidelink communication on a sidelink between the UE and another UE, and/or the like (e.g., which may be referred to as Mode 1 sidelink operation). Moreover, the UE may be configured to perform sidelink DRX operation on the sidelink and access link DRX operation on the access link. However, the sidelink DRX operation and the access link DRX operation of the UE may be uncoordinated, such that the UE asynchronously and/or independently performs sidelink DRX operation and access link DRX operation. This may cause sidelink DRX sleep modes and access link DRX sleep modes to be misaligned, may cause sidelink DRX on modes and access link DRX on modes to be misaligned, and/or may cause sidelink DRX cycles and access link DRX cycles to be misaligned, which may reduce the battery life conservation that is provided by sidelink DRX operation and access link DRX operation, or causing communication delay if the sidelink operations requires control signaling over the access link.

Some aspects described herein provide techniques and apparatuses for DRX operation for mode 1 sidelink. In some aspects, a BS may configure a sidelink DRX configuration for sidelink DRX operation of a UE and an access link DRX configuration for sidelink DRX operation of the UE. The UE may perform sidelink communication with another UE based at least in part on the sidelink DRX configuration and/or may perform access link communication with the BS based at least in part on the access link DRX configuration. The BS may configure the sidelink DRX configuration and the access link DRX configuration such that the sidelink DRX configuration and the access link DRX configuration synchronize sidelink DRX operation and access link DRX operation of the UE, which increases the efficiency of sidelink DRX operation and access link DRX operation of the UE, increases the amount of time that the UE is permitted to operate in a sidelink DRX sleep mode and an access link DRX sleep mode (e.g., which increases battery life conservation of the UE), and/or the like.

In some aspects, a UE may transmit, to a BS, a request for radio resources for transmitting a sidelink communication to another UE. The BS may receive the request and may determine that the other UE is operating in a sidelink DRX sleep mode. The BS may cause the other UE to terminate sidelink DRX operation and may transmit, to the UE, an indication of a timing for retransmitting the request for radio resources to the BS. In this way, the other UE may terminate sidelink DRX operation such that the other UE is ready and available to receive the sidelink communication from the UE, which reduces the likelihood that the other UE may be in the sidelink DRX sleep mode when the UE transmits the sidelink communication to the other UE. This increases the likelihood that the sidelink communication will be successfully received at the other UE, decreases dropped sidelink communications, and/or the like. Moreover, in this way, the UE is aware of the timing for retransmitting the request for the radio resources, which decreases the quantity of requests that the UE transmits to the BS, which in turn decreases the consumption of resources on the access link between the UE and the BS.

In some cases, a UE may receive a sidelink configured grant from a BS. The sidelink configured grant may identify a periodic and/or semi-persistent set of time-domain resources and/or frequency-domain resources that the UE may use to perform sidelink communication with another UE. After receiving the sidelink configured grant, the UE may transition from a connected mode on an access link with the BS to an idle mode or inactive mode on the access link, which may cause the sidelink configured grant to be invalidated for the UE. In this case, the UE may no longer be permitted to use the sidelink configured grant for sidelink communication with the UE, which may cause disruptions in sidelink communication between the UE and another UE.

Some aspects described herein provide techniques and apparatuses for sidelink configured grant usage based at least in part on a change in connectivity mode. In some aspects, a UE may continue to use a sidelink configured grant to perform sidelink communication with another UE while the UE is in the idle mode or inactive mode. In this way, the UE is permitted to continue to use the sidelink configured grant when the UE is no longer in a connected mode on the access link with the BS, while the UE moves between difference cells, and/or the like, which reduces and/or prevents disruptions in sidelink communication between the UE and the other UE.

In some cases, a UE may be relatively inactive on an access link between the UE and a BS. For example, traffic to and/or from the UE may be sporadic and/or infrequent. In some cases, an access link inactivity timer associated with the access link may expire due to the sporadic and/or infrequent nature of the traffic to and/or from the UE on the access link. The expiration of the access link inactivity timer may cause the UE to transition to an idle mode or an inactive mode on the access link, which may cause the sidelink configured grant to be invalidated for the UE. In this case, the UE may no longer be permitted to use the sidelink configured grant for sidelink communication with the other UE, which may cause disruptions in sidelink communication between the UE and the other UE.

Some aspects described herein provide techniques and apparatuses for maintaining a connectivity mode based at least in part on sidelink activity. In some aspects, a UE may be permitted to virtually suspend an access link inactivity timer associated with an access link between the UE and a BS, such that the UE is permitted to continue to use a sidelink configured grant to communicate with another UE on a sidelink. This reduces and/or prevents the likelihood that expiration of the access link inactivity timer will cause disruptions in sidelink communication between the UE and the other UE.

Figure 4:
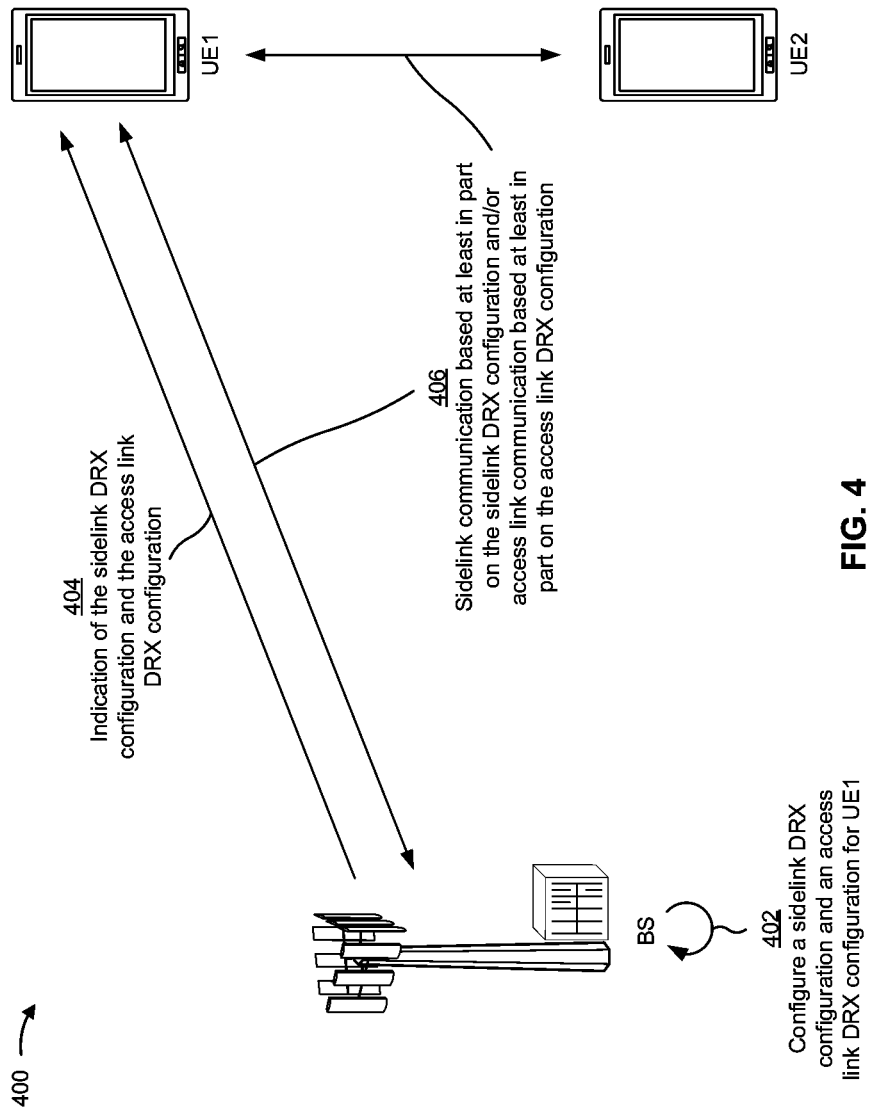
FIGS. 4-6 are diagrams illustrating examples of DRX operation for mode 1 sidelink, in accordance with various aspects of the present disclosure.

FIG. 4 is a diagram illustrating one or more examples 400 of DRX operation for mode 1 sidelink, in accordance with various aspects of the present disclosure. As shown in FIG. 4, example(s) 400 may include sidelink communication between a plurality of UEs (e.g., UEs 120), such as UE1 and UE2, and access link communication between a UE (e.g., UE1) and a BS (e.g., BS 110). In some aspects, UE1 may be communicatively connected with the BS via an access link and may be communicatively connected with UE2 via a sidelink.

As shown in FIG. 4, and by reference number 402, the BS may configure a sidelink DRX configuration for sidelink DRX operation of UE1 on the sidelink, and may configure an access link DRX configuration for access link DRX operation of UE1 on the access link.

In some aspects, the sidelink DRX configuration may identify one or more parameters for sidelink DRX operation of UE1, such as a sidelink DRX inactivity timer, a starting time of a sidelink DRX sleep mode (e.g., a slot and/or orthogonal frequency division multiplexing (OFDM) symbol in which the sidelink DRX sleep mode is to commence), a sidelink DRX sleep duration of the sidelink DRX sleep mode, a starting time of a sidelink DRX on mode (e.g., a slot and/or symbol in which the sidelink DRX on mode is to commence), a sidelink DRX on duration of the sidelink DRX on mode, a sidelink DRX cycle duration, a configuration for short sidelink DRX cycles and/or long sidelink DRX cycles of UE1, one or more subcarriers or component carriers that are to be disabled and/or deactivated by UE1 while UE1 is in the sidelink DRX sleep mode, and/or the like.

In some aspects, the access link DRX configuration may identify one or more parameters for access link DRX operation of UE1, such as an access link DRX inactivity timer, a starting time of an access link DRX sleep mode (e.g., a slot and/or symbol in which the access link DRX sleep mode is to commence), an access link DRX sleep duration of the access link DRX sleep mode, a starting time of an access link DRX on mode (e.g., a slot and/or symbol in which the access link DRX on mode is to commence), an access link DRX on duration of the access link DRX on mode, an access link DRX cycle duration, a configuration for short access link DRX cycles and/or long access link DRX cycles of UE1, one or more subcarriers or component carriers that are to be disabled and/or deactivated by UE1 while UE1 is in the access link DRX sleep mode, and/or the like.

In some aspects, the BS may configure the sidelink DRX configuration and the access link DRX configuration such that the sidelink DRX configuration and the access link DRX configuration synchronize sidelink DRX operation and access link DRX operation of the UE. For example, the UE may transmit a request to the BS to synchronize sidelink DRX operation and access link DRX operation of the UE. The BS may receive the request and configure the sidelink DRX configuration and the access link DRX configuration such that UE1 may remain in a connected mode on the access link if UE1 is active on the sidelink (e.g., if a sidelink inactivity timer has not expired) and/or remain in a connected mode on the sidelink if UE1 is active on the access link (e.g., if an access link inactivity has not expired). The UE request may be included in in RRC signaling, such as a SidelinkUEInformation information element or communication, when indicating sidelink transmission recipients associated with the UE, in a UEAssistanceInformation information element or communication when reporting traffic patterns, and/or the like.

As another example, the BS may configure the sidelink DRX configuration and the access link DRX configuration such that UE1 enters sidelink DRX operation and access link DRX operation based at least in part on expiration of both the sidelink DRX inactivity timer and the access link DRX inactivity timer. Moreover, the BS may configure the sidelink DRX configuration and the access link DRX configuration such that the one or more parameters for sidelink DRX operation and the one or more parameters for access link DRX operation are the same parameters. In this case, the BS may configure the starting time of the sidelink DRX sleep mode and the starting time of the access link DRX sleep mode to be the same starting time (e.g., such that UE1 transitions to the sidelink DRX sleep mode and the access link DRX sleep mode at the same starting time), the sidelink DRX sleep duration and the access link DRX sleep duration to be the same duration (e.g., such that UE1 remains in the sidelink DRX on mode and the access link DRX on mode for the same duration), the starting time of the sidelink DRX on mode and the starting time of the access link DRX on mode to be the same starting time (e.g., such that UE1 transitions to the sidelink DRX on mode and the access link DRX on mode at the same starting time), the sidelink DRX on duration and the access link DRX on duration to be the same duration (e.g., such that UE1 remains in the sidelink DRX on mode and the access link DRX on mode for the same duration), the sidelink DRX cycle duration and the access link DRX cycle duration to be the same duration (e.g., such that UE1 cycles through sidelink DRX sleep modes, sidelink DRX on modes, access link DRX sleep modes, and access link DRX on modes at the same cadence), and/or the like. In this way, UE1 may perform sidelink DRX operation and access link DRX operation in a synchronized manner, which increases the amount of time that UE1 is permitted to operate in a DRX sleep mode, which increases the battery life conservation of UE1.

As further shown in FIG. 4, and by reference number 404, the BS may transmit an indication of the sidelink DRX configuration and the access link DRX configuration to UE1. In some aspects, the indication may be included in a medium access control control element (MAC-CE) communication, a downlink control information (DCI) communication, an RRC communication, and/or another type of downlink communication. In some aspects, UE1 may receive the indication of the sidelink DRX configuration and the access link DRX configuration based at least in part on transmitting, to the BS, the request to synchronize sidelink DRX operation and access link DRX operation of UE1.

As further shown in FIG. 4, and by reference number 406, UE1 may perform sidelink communication with UE2 based at least in part on the sidelink DRX configuration and/or may perform access link communication with the BS based at least in part on the access link DRX configuration. For example, UE1 may initiate sidelink DRX operation and access link DRX operation based at least in part on expiration of the sidelink DRX inactivity timer and the access link DRX inactivity timer. As another example, UE1 may transition to the sidelink DRX sleep mode and the access link DRX sleep mode at the same starting time. As another example, UE1 may refrain from monitoring for sidelink communications (e.g., physical sidelink control channel (PSCCH) communications, physical sidelink shared channel (PSSCH) communications, physical sidelink broadcast channel (PSBCH) communications, and/or other types of sidelink communications) and/or downlink communications (e.g., physical downlink control channel (PDCCH) communications, physical downlink shared channel (PDSCH) communications, physical broadcast channel (PBCH) communications, and/or the like), may disable and/or deactivate one or more component carriers configured for sidelink communication and/or access link communication, may disable and/or deactivate one or more components of UE1 (e.g., one or more transmit chain components, one or more receive chain components, and/or the like), and/or the like while in the sidelink DRX sleep mode and the access link DRX sleep mode.

In some aspects, once the sidelink DRX sleep duration and the access link DRX sleep duration expire (e.g., which may be the same duration), UE1 may transition from the sidelink DRX sleep mode to the sidelink DRX on mode for the sidelink DRX on duration and the access link DRX on mode for the access link on duration (e.g., which may be the same duration). In this case, UE1 may monitor for sidelink communications (e.g., PSCCH communications, PSSCH communications, PSBCH communication, sidelink broadcast communications, sidelink groupcast communications, and/or the like) from UE2 and/or downlink communications (e.g., PDCCH communications, PDSCH communications, PBCH communications, and/or the like) from the BS while UE1 is in the sidelink DRX on mode and the access link DRX on mode.

In some aspects, UE1 may terminate sidelink DRX operation of UE1 by transmitting a sidelink communication while UE1 is in the sidelink DRX on mode. In this case, termination of the sidelink DRX operation of UE1 may cause UE1 to also terminate access link DRX operation of UE1. Similarly, termination of access link DRX operation of UE1 may cause UE1 to also terminate sidelink DRX operation of UE1.

In this way, the BS may configure a sidelink DRX configuration for sidelink DRX operation of UE1 and an access link DRX configuration for sidelink DRX operation of UE1. UE1 may perform sidelink communication with UE2 based at least in part on the sidelink DRX configuration and/or may perform access link communication with the BS based at least in part on the access link DRX configuration. The BS may configure the sidelink DRX configuration and the access link DRX configuration such that the sidelink DRX configuration and the access link DRX configuration synchronize sidelink DRX operation and access link DRX operation of UE1, which increases the efficiency of sidelink DRX operation and access link DRX operation of UE1, increases the amount of time that UE1 is permitted to operate in a sidelink DRX sleep mode and an access link DRX sleep mode (e.g., which increases battery life conservation of UE1), and/or the like.

As indicated above, FIG. 4 is provided as one or more examples. Other examples may differ from what is described with respect to FIG. 4.

Figure 5:
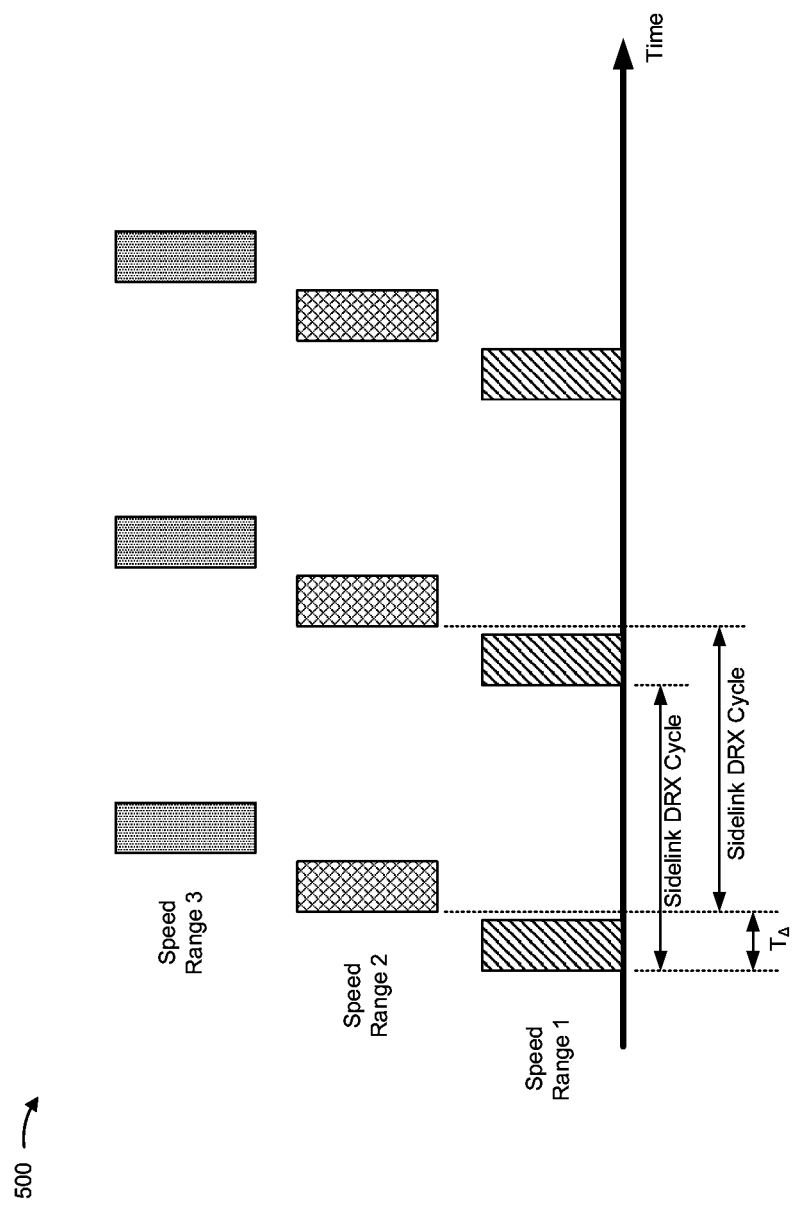

FIG. 5 is a diagram illustrating one or more examples 500 of DRX operation for mode 1 sidelink, in accordance with various aspects of the present disclosure. In some aspects, example(s) 500 may illustrate an example of sidelink DRX operation of one or more UEs (e.g., UEs 120).

As shown in FIG. 5, a UE may be configured to perform sidelink DRX operation based at least in part on a sidelink DRX configuration that is based at least in part on a speed of travel of the UE. The UE may be configured with a plurality of sidelink DRX configurations, where each of the plurality of sidelink DRX configurations is associated with a respective speed range. For example, a first sidelink DRX configuration may be associated with speed range 1 (e.g., 21-30 kilometers per hour (km/hr)), a second sidelink DRX configuration may be associated with speed range 2 (e.g., 31-40 km/hr), a third sidelink DRX configuration may be associated with speed range 3 (e.g., 41-50 km/hr), and so on. The UE may perform sidelink operation based at least in part on the sidelink DRX configuration associated with the speed range in which the speed at which the UE is traveling is included.

In some aspects, each of the plurality of sidelink DRX configurations may be associated with one or more different sidelink DRX operation parameters. This permits UEs associated with similar modes of travel (e.g., UEs associated with travel by vehicle, UEs associated with travel by cycle, and/or the like) to coordinate and/or synchronize sidelink DRX operation. As shown in FIG. 5, for example, the starting time of sidelink DRX cycles for each speed range may be staggered in the time domain by a time duration TA. In some aspects, TA may be the same for each speed range (e.g., the sidelink DRX cycles for each speed range may be staggered by the same time duration). In some aspects, TA may be different for one or more speed ranges (e.g., the sidelink DRX cycles for one or more speed range may be staggered by different time durations). In some aspects, other parameters for sidelink DRX operation, such as a starting time of a sidelink DRX on mode, a starting time of a sidelink DRX sleep duration, a sidelink DRX on duration, a sidelink DRX sleep duration, a sidelink DRX cycle duration, and/or the like may be the same or different across one or more speed ranges.

As indicated above, FIG. 5 is provided as one or more examples. Other examples may differ from what is described with respect to FIG. 5.

Figure 6:
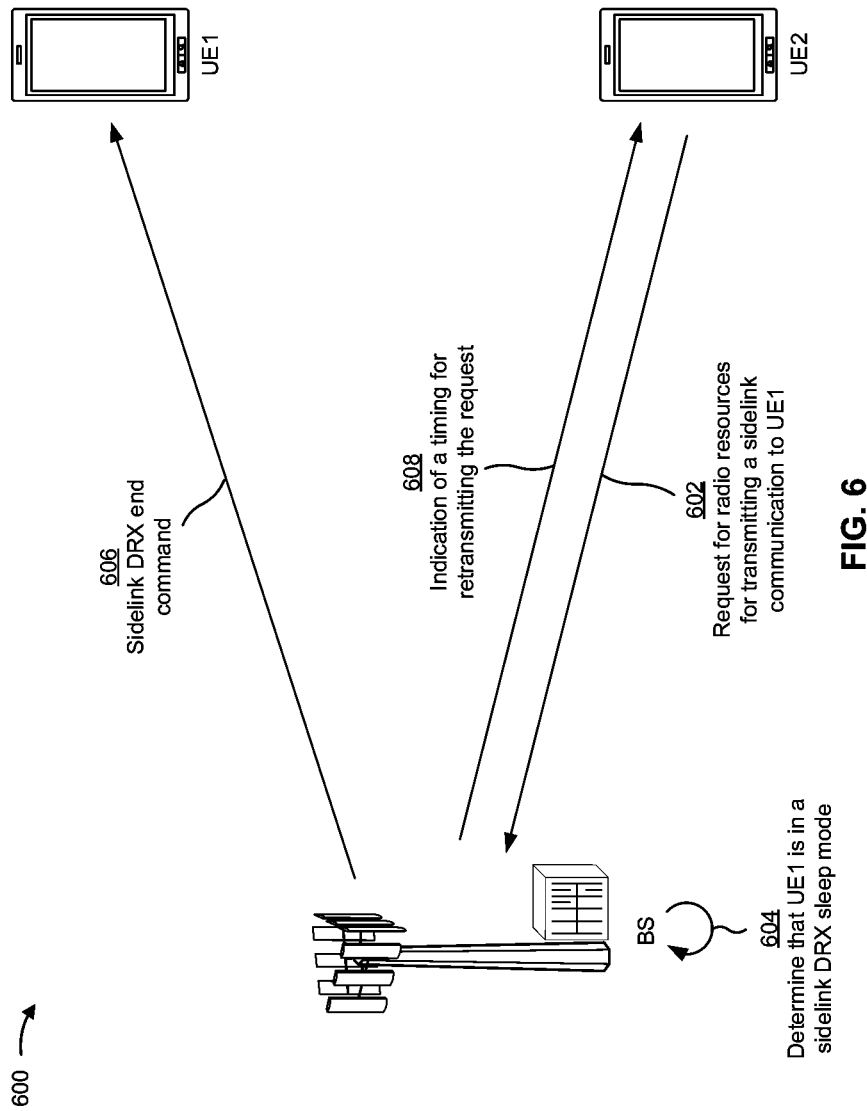

FIG. 6 is a diagram illustrating one or more examples 600 of DRX operation for mode 1 sidelink, in accordance with various aspects of the present disclosure. As shown in FIG. 6, example(s) 600 may include sidelink communication between a plurality of UEs (e.g., UEs 120), such as UE1 and UE2, and access link communication between a UE (e.g., UE1) and a BS (e.g., BS 110). In some aspects, UE1 and UE2 may be communicatively connected with the BS via respective access links. In some aspects, UE1 and UE2 may be communicatively connected via a sidelink.

In some aspects, the BS may configure UE1 to perform sidelink DRX operation by transmitting an indication of a sidelink DRX configuration to UE1. UE1 may perform sidelink DRX operation based at least in part on the sidelink DRX configuration. The sidelink DRX operation may identify one or more parameters for sidelink DRX operation of UE1, such as one or more of the parameters for sidelink DRX operation described above.

As shown in FIG. 6, and by reference number 602, UE2 may be configured to transmit a sidelink communication to UE1, and may transmit, to the BS, a request for radio resources for transmitting the sidelink communication to UE2. The radio resources may include a time-domain resource (e.g., one or more slots, one or more OFDM symbols, and/or the like) and/or a frequency-domain resource (e.g., one or more subcarriers and/or the like) in which to transmit the sidelink communication to UE2.

In some aspects, the request may include a buffer status report and/or another type of indication that UE2 is buffering data that is to be transmitted to UE1. UE2 may transmit the buffer status report in an uplink communication, such as a MAC-CE, an uplink control information (UCI) communication, and/or another type of uplink communication.

As further shown in FIG. 6, and by reference number 604, the BS may receive the request and may determine that UE1 is in a sidelink DRX sleep mode. For example, the BS may determine that UE1 is in the sidelink DRX sleep mode based at least in part on the sidelink DRX configuration that the BS configured for UE1.

As further shown in FIG. 6, and by reference number 606, the BS may transmit, to UE1, a sidelink DRX end command to cause UE1 to terminate sidelink DRX operation of UE1. In some aspects, the BS may transmit the sidelink DRX end command to UE1, based at least in part on determining that UE1 is in the sidelink DRX sleep mode and that UE2 is buffering data that is to be transmitted to UE1.

In some aspects, the BS may transmit the sidelink DRX end command to UE1 when UE1 is in a sidelink DRX on mode (e.g., after UE1 has transitioned out of the sidelink DRX on mode). In some aspects, UE1 may receive the sidelink DRX end command from the BS and terminate other sidelink DRX operation of UE1 such that UE1 may prepare to receive the data the UE2 is buffering. In some aspects, UE1 may perform sidelink communication with one or more other UEs. In this case, UE1 may be configured with respective sidelink DRX configurations for each of the other UEs. The sidelink DRX end command may trigger UE1 to terminate sidelink DRX operation with the other UEs and to prepare to receive data from UE2.

As further shown in FIG. 6, and by reference umber 608, the BS may transmit, to UE2, an indication of a timing for retransmitting the request for radio resources (e.g., the request for radio resources for transmitting the buffered data in a sidelink communication to UE1) to the BS. In some aspects, the BS may transmit the indication in a MAC-CE communication, a DCI communication, an RRC communication, and/or another type of downlink communication. The indication of the timing for retransmitting the request may identify a particular slot, OFDM symbol, and/or the like in which UE2 may retransmit the request for radio resources to the BS.

In some aspects, the BS may transmit, to UE2, an indication of a sidelink grant for a time period when UE1 is no longer in the sidelink DRX sleep mode such that UE2 may transmit sidelink communications to UE1 during the time period, may request radio resources for transmitting sidelink communications to UE1 during the time period, and/or the like. In some aspects, the sidelink grant may be included in a DCI communication, an RRC communication, a MAC-CE communication, and/or the like.

In some aspects, UE2 may receive the indication of the timing for retransmitting the request for radio resources and may retransmit the request to the BS based at least in part on the indication. The BS may receive the retransmission of the request, may determine that UE1 has terminated sidelink DRX operation and is ready to receive the data being buffered at UE2, and may transmit a sidelink grant to UE2. The sidelink grant may identify the radio resources that UE2 may use to transmit the buffered data to UE1 in a sidelink communication.

In this way, UE2 may transmit, to the BS, a request for radio resources for transmitting a sidelink communication to UE1. The BS may receive the request and may determine that UE1 is operating in a sidelink DRX sleep mode. The BS may cause UE1 to terminate sidelink DRX operation of UE1 and may transmit, to UE2, an indication of a timing for retransmitting the request for radio resources to the BS. In this way, UE1 may terminate sidelink DRX operation such that UE1 is ready and available to receive the sidelink communication from UE2, which reduces the likelihood that UE1 may be in the sidelink DRX sleep mode when UE2 transmits the sidelink communication to UE1. This increases the likelihood that the sidelink communication will be successfully received at UE1, decreases dropped sidelink communications, and/or the like. Moreover, in this way, UE2 is aware of the timing for retransmitting the request for the radio resources, which decreases the quantity of requests that UE2 transmits to the BS, which decreases the consumption of resources on the access link between UE2 and the BS.

As indicated above, FIG. 6 is provided as one or more examples. Other examples may differ from what is described with respect to FIG. 6.

Figure 7:
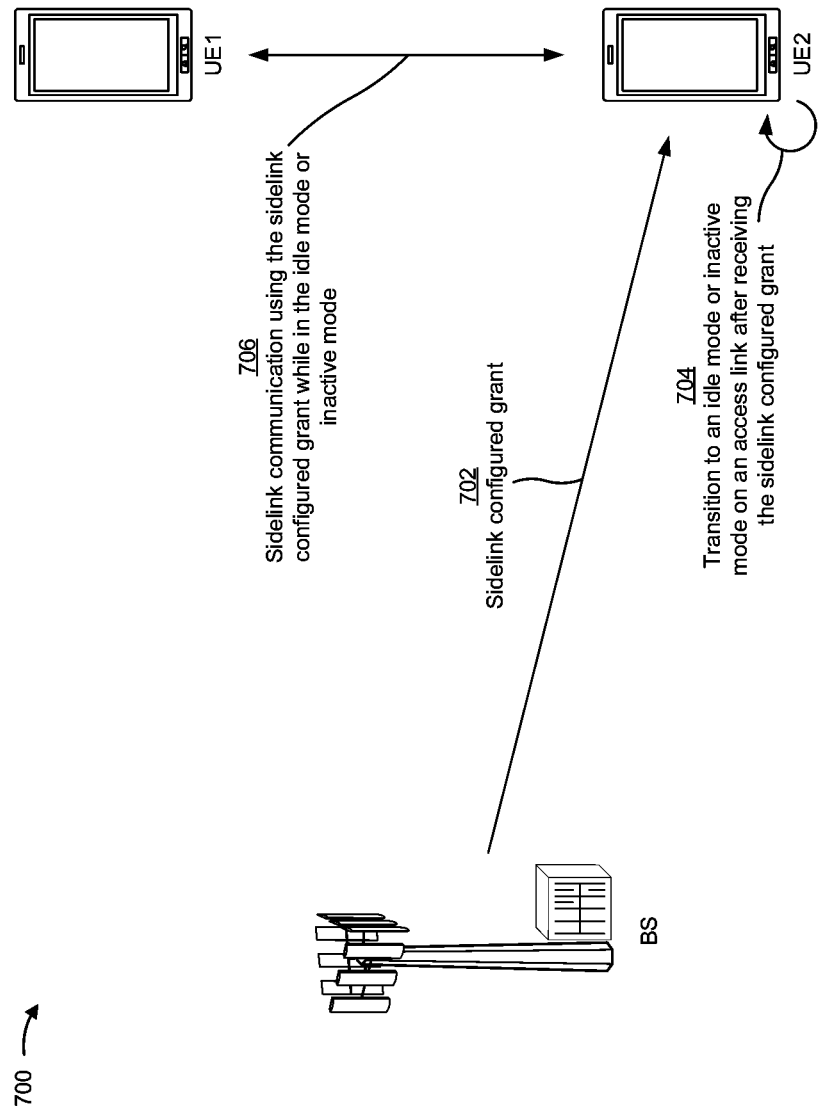
FIG. 7 is a diagram illustrating one or more examples of sidelink configured grant usage based at least in part on a change in connectivity mode, in accordance with various aspects of the present disclosure.

FIG. 7 is a diagram illustrating one or more examples 700 of sidelink configured grant usage based at least in part on a change in connectivity mode, in accordance with various aspects of the present disclosure. As shown in FIG. 7, example(s) 700 may include sidelink communication between a plurality of UEs (e.g., UEs 120), such as UE1 and UE2, and access link communication between a UE (e.g., UE1) and a BS (e.g., BS 110). In some aspects, UE2 may be communicatively connected with the BS via an access link. In some aspects, UE1 and UE2 may be communicatively connected via a sidelink.

As shown in FIG. 7, and by reference number 702, the BS may transmit a sidelink configured grant to UE2. The sidelink configured grant may also be referred to as a Type 1 grant (e.g., an RRC configured and activated grant), and may identify a periodic and/or semi-persistent set of time-domain resources and/or frequency-domain resources that UE2 may use to transmit sidelink communications to, and/or receive sidelink communications from, UE1 on the sidelink.

As further shown in FIG. 7, and by reference number 704, UE2 may transition to an idle mode or inactive mode on the access link after receiving the sidelink configured grant. In this case, UE2 may suspend an RRC configuration for the access link (e.g., in the case of transitioning to an inactive mode) or release an RRC connection with the BS (e.g., in the case of transitioning to an idle mode) such that UE2 and the BS are no longer in a connected mode on the access link. In some aspects, UE2 may determine to transition to the idle mode or inactive mode based at least in part on receiving an instruction from the BS, based at least in part on an expiration of an access link inactivity timer, and/or the like.

As further shown in FIG. 7, and by reference number 706, UE2 may perform sidelink communication with UE1 using the sidelink configured grant while in the idle mode or inactive mode. For example, UE2 may transmit sidelink communications to UE1 in the periodic and/or semi-persistent set of time-domain resources and/or frequency-domain resources identified by the sidelink configured grant, may receive sidelink communications from UE1 in the periodic and/or semi-persistent set of time-domain resources and/or frequency-domain resources identified by the sidelink configured grant, and/or the like.

In some aspects, the BS may configure the sidelink configured grant for a particular radio access network (RAN) notification area (RNA). In this case, UE2 may perform sidelink communication with UE1 using the sidelink configured grant while UE2 is located in the RNA. Upon a request from UE2, the BS may preserve the sidelink configured grant for a particular time period, even if UE2 enters an RRC idle mode on the access link.

In some aspects, UE2 may perform sidelink communication with UE1 using the sidelink configured grant while in the idle mode or inactive mode based at least in part on being configured to perform sidelink communication using the sidelink configured grant while in the idle mode or inactive mode, based at least in part on receiving, from the BS, an indication that UE2 is permitted to perform sidelink communication using the sidelink configured grant while in the idle mode or inactive mode, and/or the like.

In this way, UE2 is permitted to continue to use the sidelink configured grant when UE2 is no longer in a connected mode on the access link with the BS, while UE2 moves between difference cells, for a time period indicated by the BS together with the sidelink configured grant, and/or the like. When UE2 moves outside of the RNA area, UE2 may signal to the BS or another BS in order to either release the old sidelink configured grant, or renew with a new sidelink configured grant in the new area for continuous sidelink communication. Such signaling can be via RRC communications, MAC CE communications, and/or the like.

As indicated above, FIG. 7 is provided as one or more examples. Other examples may differ from what is described with respect to FIG. 7.

Figure 8:
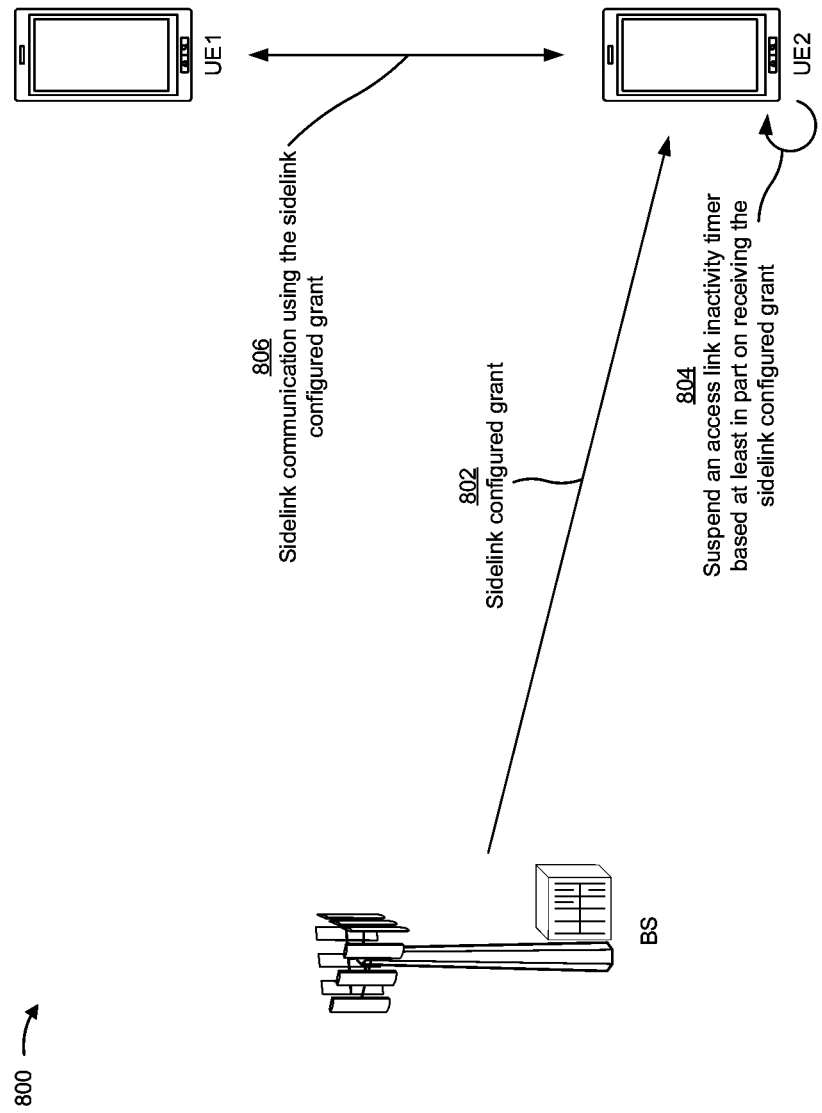
FIG. 8 is a diagram illustrating one or more examples of maintaining a connectivity mode based at least in part on sidelink activity, in accordance with various aspects of the present disclosure.

FIG. 8 is a diagram illustrating one or more examples 800 of maintaining a connectivity mode based at least in part on sidelink activity, in accordance with various aspects of the present disclosure. As shown in FIG. 8, example(s) 800 may include sidelink communication between a plurality of UEs (e.g., UEs 120), such as UE1 and UE2, and access link communication between a UE (e.g., UE1) and a BS (e.g., BS 110). In some aspects, UE2 may be communicatively connected with the BS via an access link. In some aspects, UE1 and UE2 may be communicatively connected via a sidelink.

As shown in FIG. 8, and by reference number 802, the BS may transmit a sidelink configured grant to UE2. The sidelink configured grant may also be referred to as a Type 1 grant (e.g., an RRC configured and activated grant), and may identify a periodic and/or semi-persistent set of time-domain resources and/or frequency-domain resources that UE2 may use to transmit sidelink communications to, and/or receive sidelink communications from, UE1 on the sidelink.

In some cases, UE2 may be relatively inactive on the access link. For example, traffic to and/or from UE2 may be sporadic and/or infrequent. In some cases, an access link inactivity timer associated with the access link may expire due to the sporadic and/or infrequent nature of the traffic to and/or from UE2 on the access link. If the expiration of the access link inactivity timer may cause UE2 to transition to an idle mode or an inactive mode on the access link, which may cause the sidelink configured grant to be invalidated for UE2. In this case, UE2 may no longer be permitted to use the sidelink configured grant for sidelink communication with UE2, which may cause disruptions in sidelink communication between UE2 and UE1.

As further shown in FIG. 8, and by reference number 804, to reduce disruptions in sidelink communication between UE2 and UE1, UE2 may suspend the access link inactivity timer for the access link such that UE2 refrains from transitioning to the idle mode or the inactive mode on the access link. This may reduce and/or prevent disruptions in sidelink communication between UE2 and UE1 that would have otherwise been caused by the sidelink configured grant being invalidated for UE2 due to UE2 transitioning to the idle mode or the inactive mode on the access link.

In some aspects, UE2 may suspend the access link inactivity timer based at least in part on determining that a sidelink inactivity timer associated with the sidelink is not expired. In some aspects, UE2 may suspend the access link inactivity timer based at least in part on being configured to suspend the access link inactivity timer while being configured with a valid sidelink configured grant, based at least in part on receiving, from the BS, an indication that UE2 is permitted to suspend the access link inactivity timer, and/or the like.

In some aspects, UE2 may suspend the access link inactivity timer based at least in part on the sidelink configured grant including a suspending indication, which may be an indication that UE2 is to suspend the access link inactivity timer. UE2 may receive the sidelink configured grant with the suspending indication based at least in part on transmitting, to the BS and when requesting a sidelink communication grant, an indication to suspend an inactivity timer.

As further shown in FIG. 8, and by reference number 806, UE2 may perform sidelink communication with UE1 using the sidelink configured grant. For example, UE2 may transmit sidelink communications to UE1 in the periodic and/or semi-persistent set of time-domain resources and/or frequency-domain resources identified by the sidelink configured grant, may receive sidelink communications from UE1 in the periodic and/or semi-persistent set of time-domain resources and/or frequency-domain resources identified by the sidelink configured grant, and/or the like.

In this way, UE2 is permitted to suspend an access link inactivity timer associated with an access link between UE2 and the BS, such that UE2 is permitted to continue to use the sidelink configured grant to communicate with UE1. This reduces and/or prevents the likelihood that expiration of the access link inactivity timer will cause disruptions in sidelink communication between UE2 and UE1.

As indicated above, FIG. 8 is provided as one or more examples. Other examples may differ from what is described with respect to FIG. 8.

Figure 9:
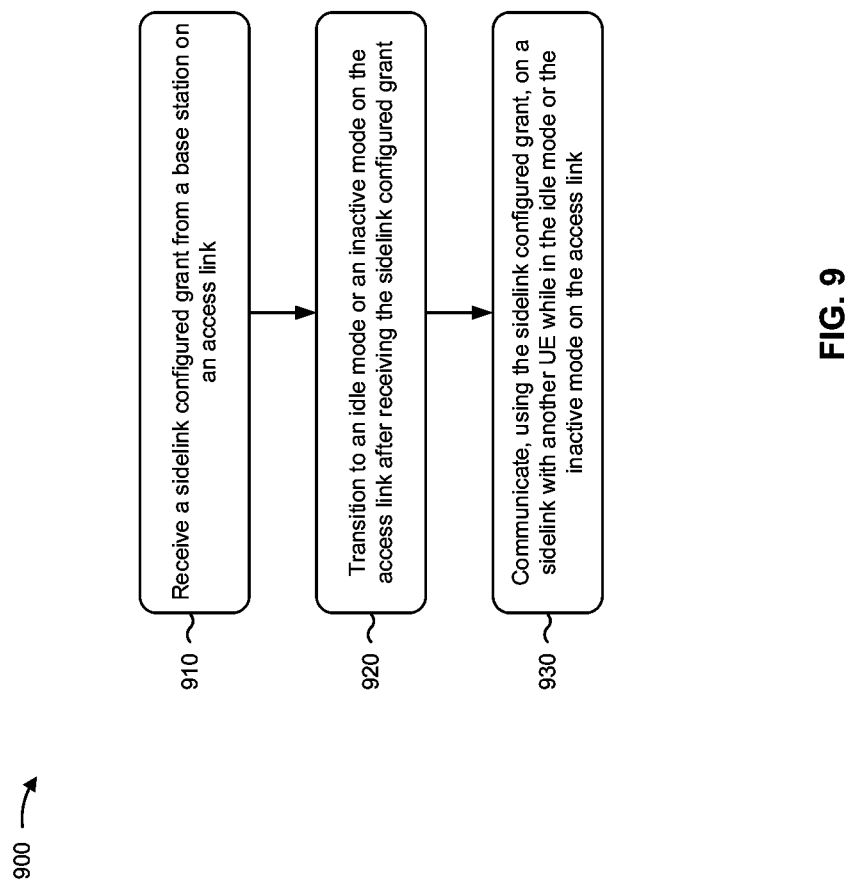
FIGS. 9-11 are diagrams illustrating example processes performed, for example, by a UE, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120) performs operations associated with sidelink configured grant usage based at least in part on a change in connectivity mode.

As shown in FIG. 9, in some aspects, process 900 may include receiving a sidelink configured grant from a base station on an access link (block 910). For example, the UE (e.g., using receive processor 258, transmit processor 264, controller/processor 280, memory 282, and/or the like) may receive a sidelink configured grant from a base station on an access link, as described above.

As further shown in FIG. 9, in some aspects, process 900 may include transitioning to an idle mode or an inactive mode on the access link after receiving the sidelink configured grant (block 920). For example, the UE (e.g., using receive processor 258, transmit processor 264, controller/processor 280, memory 282, and/or the like) may transition to an idle mode or an inactive mode on the access link after receiving the sidelink configured grant, as described above.

As further shown in FIG. 9, in some aspects, process 900 may include communicating, using the sidelink configured grant, on a sidelink with another UE while in the idle mode or the inactive mode on the access link (block 930). For example, the UE (e.g., using receive processor 258, transmit processor 264, controller/processor 280, memory 282, and/or the like) may communicate, using the sidelink configured grant, on a sidelink with another UE while in the idle mode or the inactive mode on the access link, as described above.

Process 900 may include additional aspects, such as any single aspect or any combination of aspects described below and/or in connection with one or more other processes described elsewhere herein.

In an a first aspect, communicating, using the sidelink configured grant, on the sidelink with the other UE while in the idle mode or the inactive mode on the access link comprises communicating, using the sidelink configured grant, on the sidelink with the other UE while being located in a particular RNA and for a time period indicated by the base station together with the sidelink configured grant. In a second aspect, alone or in combination with the first aspect, process 900 includes transitioning to an active mode on the access link, transmitting, to the base station and when requesting a sidelink communication grant, an indication to suspend an inactivity timer, and receiving, from the base station and based at least in part on transmitting the indication, another sidelink configured grant with a suspending indication from the base station on the access link. In a third aspect, alone or in combination with one or more of the first or second aspects, process 900 includes suspending, based at least in part on receiving the other sidelink configured grant with the suspending indication, an access link inactivity timer such that the UE refrains from transitioning back to the idle mode or the inactive mode on the access link.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
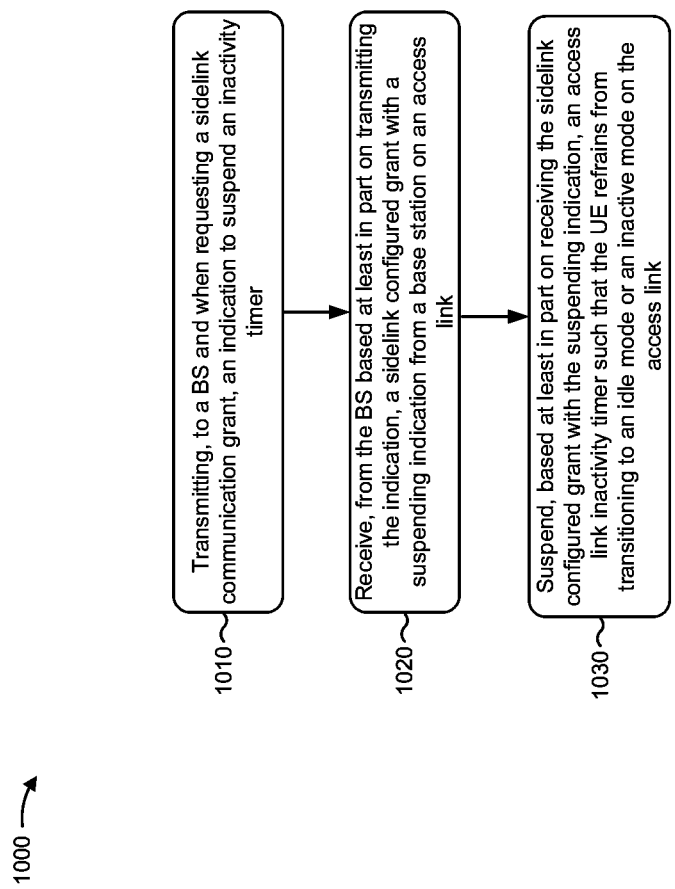

FIG. 10 is a diagram illustrating an example process 1000 performed, for example, by a UE, in accordance with various aspects of the present disclosure. Example process 1000 is an example where a UE (e.g., UE 120) performs operations associated with maintaining a connectivity mode based at least in part on sidelink activity.

As shown in FIG. 10, in some aspects, process 1000 may include transmitting, to a BS and when requesting a sidelink communication grant, an indication to suspend an inactivity timer (block 1010). For example, the UE (e.g., using receive processor 258, transmit processor 264, controller/processor 280, memory 282, and/or the like) may transmit, to a BS and when requesting a sidelink communication grant, an indication to suspend an inactivity timer, as described above.

As further shown in FIG. 10, in some aspects, process 1000 may include receiving, from the BS based at least in part on transmitting the indication, a sidelink configured grant with a suspending indication from a base station on an access link (block 1020). For example, the UE (e.g., using receive processor 258, transmit processor 264, controller/processor 280, memory 282, and/or the like) may receive, from the BS based at least in part on transmitting the indication, a sidelink configured grant with a suspending indication from a base station on an access link, as described above.

As further shown in FIG. 10, in some aspects, process 1000 may include suspending, based at least in part on receiving the sidelink configured grant, an access link inactivity timer such that the UE refrains from transitioning to an idle mode or an inactive mode on the access link (block 1030). For example, the UE (e.g., using receive processor 258, transmit processor 264, controller/processor 280, memory 282, and/or the like) may suspend, based at least in part on receiving the sidelink configured grant, an access link inactivity timer such that the UE refrains from transitioning to an idle mode or an inactive mode on the access link, as described above.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
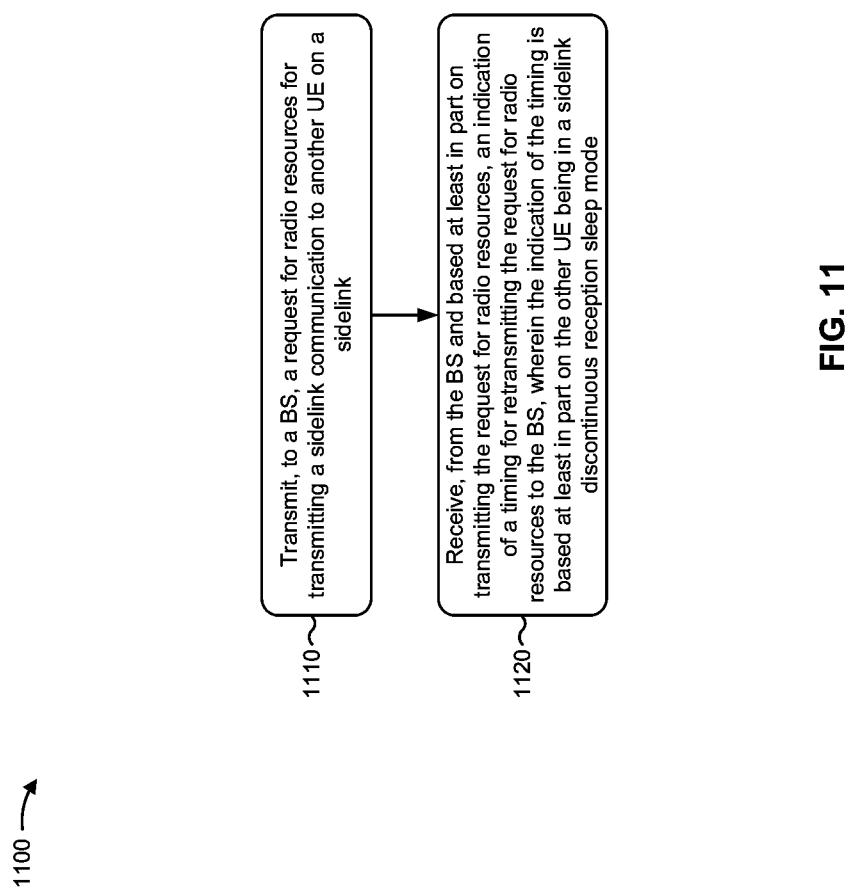

FIG. 11 is a diagram illustrating an example process 1100 performed, for example, by a UE, in accordance with various aspects of the present disclosure. Example process 1100 is an example where a UE (e.g., UE 120) performs operations associated with DRX for mode 1 sidelink.

As shown in FIG. 11, in some aspects, process 1100 may include transmitting, to a BS, a request for radio resources for transmitting a sidelink communication to another UE on a sidelink (block 1110). For example, the UE (e.g., using receive processor 258, transmit processor 264, controller/processor 280, memory 282, and/or the like) may transmit, to a BS, a request for radio resources for transmitting a sidelink communication to another UE on a sidelink, as described above.

As further shown in FIG. 11, in some aspects, process 1100 may include receiving, from the BS and based at least in part on transmitting the request for radio resources, an indication of a timing for retransmitting the request for radio resources to the BS, wherein the indication of the timing is based at least in part on the other UE being in a sidelink discontinuous reception sleep mode (block 1120). For example, the UE (e.g., using receive processor 258, transmit processor 264, controller/processor 280, memory 282, and/or the like) may receive, from the BS and based at least in part on transmitting the request for radio resources, an indication of a timing for retransmitting the request for radio resources to the BS, as described above. In some aspects, the indication of the timing is based at least in part on the other UE being in a sidelink discontinuous reception sleep mode.

Process 1100 may include additional aspects, such as any single aspect or any combination of aspects described below and/or in connection with one or more other processes described elsewhere herein.

In an aspect, the request for radio resources comprises a buffer status report associated with the UE and the indication of the timing is included in a MAC-CE communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
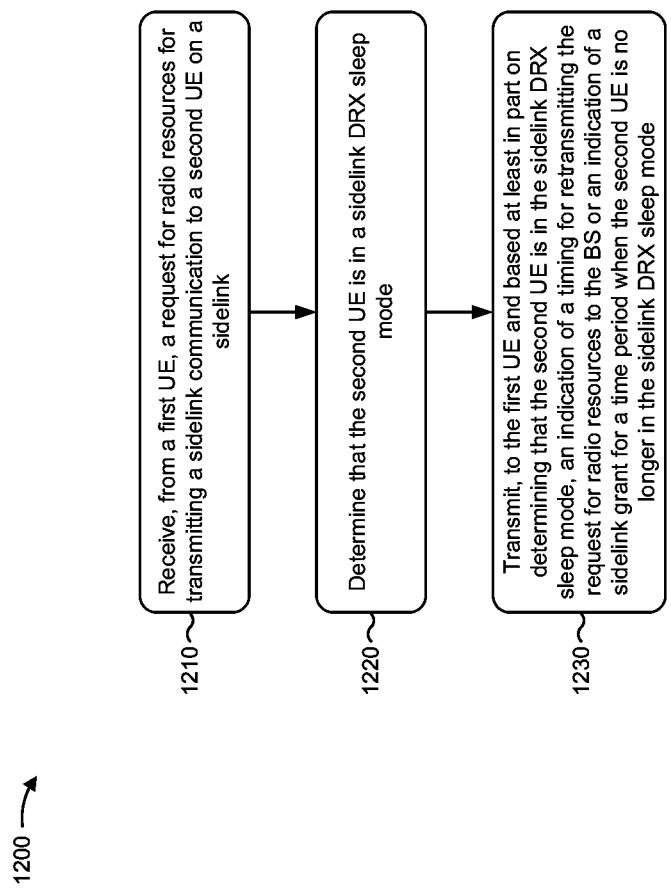
FIG. 12 is a diagram illustrating an example process performed, for example, by a BS, in accordance with various aspects of the present disclosure.

FIG. 12 is a diagram illustrating an example process 1200 performed, for example, by a BS, in accordance with various aspects of the present disclosure. Example process 1200 is an example where a BS (e.g., BS 110) performs operations associated with DRX for mode 1 sidelink.

As shown in FIG. 12, in some aspects, process 1200 may include receiving, from a first UE, a request for radio resources for transmitting a sidelink communication to a second UE on a sidelink (block 1210). For example, the BS (e.g., using transmit processor 220, receive processor 238, controller/processor 240, memory 242, and/or the like) may receive, from a first UE, a request for radio resources for transmitting a sidelink communication to a second UE on a sidelink, as described above.

As further shown in FIG. 12, in some aspects, process 1200 may include determining that the second UE is in a sidelink DRX sleep mode (block 1220). For example, the BS (e.g., using transmit processor 220, receive processor 238, controller/processor 240, memory 242, and/or the like) may determine that the second UE is in a sidelink DRX sleep mode, as described above.

As further shown in FIG. 12, in some aspects, process 1200 may include transmitting, to the first UE and based at least in part on determining that the second UE is in the sidelink DRX sleep mode, an indication of a timing for retransmitting the request for radio resources to the BS or an indication of a sidelink grant for a time period when the second UE is no longer in the sidelink DRX sleep mode (block 1230). For example, the BS (e.g., using transmit processor 220, receive processor 238, controller/processor 240, memory 242, and/or the like) may transmit, to the first UE and based at least in part on determining that the second UE is in the sidelink DRX sleep mode, an indication of a timing for retransmitting the request for radio resources to the BS or an indication of a sidelink grant for a time period when the second UE is no longer in the sidelink DRX sleep mode, as described above.

Process 1200 may include additional aspects, such as any single aspect or any combination of aspects described below and/or in connection with one or more other processes described elsewhere herein.

In a first aspect, the request for radio resources comprises a buffer status report associated with the UE, the indication of the timing is included in a MAC-CE communication, and the indication of the sidelink grant is included in a downlink control information communication. In a second aspect, alone or in combination with the first aspect, process 1200 further comprises transmitting, to the second UE and based at least in part on determining that the second UE is in the sidelink DRX sleep mode, a sidelink DRX end command to cause the second UE to terminate sidelink DRX operation of the second UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a UE, in accordance with various aspects of the present disclosure. Example process 1300 is an example where a UE (e.g., UE 120) performs operations associated with DRX for mode 1 sidelink.

As shown in FIG. 13, in some aspects, process 1300 may include transmitting, to a BS, a request to synchronize access link DRX operation and sidelink DRX operation of the UE (block 1310). For example, the UE (e.g., using receive processor 258, transmit processor 264, controller/processor 280, memory 282, and/or the like) may transmit, to a BS, a request to synchronize access link DRX operation and sidelink DRX operation of the UE, as described above.

As shown in FIG. 13, in some aspects, process 1300 may include receiving, from the BS and based at least in part on transmitting the request, an indication of an access link DRX configuration and a sidelink DRX configuration, wherein the access link DRX configuration and the sidelink DRX configuration synchronize access link DRX operation and sidelink DRX operation of the UE (block 1320). For example, the UE (e.g., using receive processor 258, transmit processor 264, controller/processor 280, memory 282, and/or the like) may receive, from the BS and based at least in part on transmitting the request, an indication of an access link DRX configuration and a sidelink DRX configuration, as described above. In some aspects, the access link DRX configuration and the sidelink DRX configuration synchronize access link DRX operation and sidelink DRX operation of the UE.

As further shown in FIG. 13, in some aspects, process 1300 may include at least one of: performing access link communication with the BS based at least in part on the access link DRX configuration, or performing sidelink communication with another UE based at least in part on the sidelink DRX configuration (block 1330). For example, the UE (e.g., using receive processor 258, transmit processor 264, controller/processor 280, memory 282, and/or the like) may at least one of: perform access link communication with the BS based at least in part on the access link DRX configuration, or perform sidelink communication with another UE based at least in part on the sidelink DRX configuration, as described above.

Process 1300 may include additional aspects, such as any single aspect or any combination of aspects described below and/or in connection with one or more other processes described elsewhere herein.

In a first aspect, performing access link communication with the BS based at least in part on the access link DRX configuration comprises remaining in an access link DRX on mode based at least in part on determining that the UE is in a sidelink DRX on mode. In a second aspect, alone or in combination with the first aspect, at least one of: a sidelink DRX on mode duration, identified in the sidelink DRX configuration, and an access link DRX on mode duration, identified in the access link DRX configuration, are a same DRX on mode duration; a starting time of a sidelink DRX on mode, identified in the sidelink DRX configuration, and a starting time of an access link DRX on mode, identified in the access link DRX configuration, are a same DRX on mode starting time; or a sidelink DRX cycle duration, identified in the sidelink DRX configuration, and an access link DRX cycle duration, identified in the access link DRX configuration, are a same DRX cycle duration.

In a third aspect, alone or in combination with one or more of the first and second aspects, performing sidelink communication with another UE based at least in part on the sidelink DRX configuration comprises remaining in a sidelink DRX on mode based at least in part on determining that the UE is in an access link DRX on mode. In a fourth aspect, alone or in combination with one or more of the first through third aspects, performing sidelink communication with another UE based at least in part on the sidelink DRX configuration comprises transitioning from a sidelink DRX sleep mode to a sidelink DRX on mode based at least in part on transitioning from an access link DRX sleep mode to an access link DRX on mode.

In a fifth aspect, alone or in combination with one or more of the first through fourth aspects, performing access link communication with the BS based at least in part on the access link DRX configuration comprises transitioning from an access link DRX sleep mode to an access link DRX on mode based at least in part on transitioning from a sidelink DRX sleep mode to a sidelink DRX on mode. In a sixth aspect, alone or in combination with one or more of the first through fifth aspects, a starting time of a sidelink DRX on mode, identified in the sidelink DRX configuration, is based at least in part on a speed at which the UE is traveling. In a seventh aspect, alone or in combination with one or more of the first through sixth aspects, a sidelink DRX cycle duration, identified in the sidelink DRX configuration, is based at least in part on a speed at which the UE is traveling.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a BS, in accordance with various aspects of the present disclosure. Example process 1400 is an example where a BS (e.g., BS 110) performs operations associated with DRX for mode 1 sidelink.

As shown in FIG. 14, in some aspects, process 1400 may include configuring an access link DRX configuration and a sidelink DRX configuration for a UE such that the access link DRX configuration and the sidelink DRX configuration synchronize access link DRX operation and sidelink DRX operation of the UE (block 1410). For example, the BS (e.g., using transmit processor 220, receive processor 238, controller/processor 240, memory 242, and/or the like) may configure an access link DRX configuration and a sidelink DRX configuration for a UE such that the access link DRX configuration and the sidelink DRX configuration synchronize access link DRX operation and sidelink DRX operation of the UE, as described above.

As further shown in FIG. 14, in some aspects, process 1400 may include transmitting an indication of the access link DRX configuration and the sidelink DRX configuration to the UE (block 1420). For example, the BS (e.g., using transmit processor 220, receive processor 238, controller/processor 240, memory 242, and/or the like) may transmit an indication of the access link DRX configuration and the sidelink DRX configuration to the UE, as described above.

Process 1400 may include additional aspects, such as any single aspect or any combination of aspects described below and/or in connection with one or more other processes described elsewhere herein.

In a first aspect, at least one of a sidelink DRX on mode duration, identified in the sidelink DRX configuration, and an access link DRX on mode duration, identified in the access link DRX configuration, are a same DRX on mode duration; a starting time of a sidelink DRX on mode, identified in the sidelink DRX configuration, and a starting time of an access link DRX on mode, identified in the access link DRX configuration, are a same DRX on mode starting time; or a sidelink DRX cycle duration, identified in the sidelink DRX configuration, and an access link DRX cycle duration, identified in the access link DRX configuration, are a same DRX cycle duration.

In a second aspect, alone or in combination with the first aspect, a starting time of a sidelink DRX on mode, identified in the sidelink DRX configuration, is based at least in part on a speed at which the UE is traveling. In a third aspect, alone or in combination with one or more of the first and second aspects, a sidelink DRX cycle duration, identified in the sidelink DRX configuration, is based at least in part on a speed at which the UE is traveling.

In a fourth aspect, alone or in combination with one or more of the first through third aspects, process 1400 includes receiving, from the UE, a request for radio resources for transmitting a sidelink communication to another UE on a sidelink, determining that the other UE is in a sidelink DRX sleep mode, and transmitting, to the UE and based at least in part on determining that the other UE is in the sidelink DRX sleep mode, an indication of a timing for retransmitting the request for radio resources to the BS or an indication of a sidelink grant for a time period when the other UE is no longer in the sidelink DRX sleep mode. In a fifth aspect, alone or in combination with one or more of the first through fourth aspects, the request for radio resources comprises a buffer status report associated with the UE.

In a sixth aspect, alone or in combination with one or more of the first through fifth aspects, the indication of the timing is included in a medium access control control element communication. In a seventh aspect, alone or in combination with one or more of the first through sixth aspects, the indication of the sidelink grant is included in a downlink control information communication. In an eighth aspect, alone or in combination with one or more of the first through seventh aspects, process 1400 includes transmitting, to the other UE and based at least in part on determining that the other UE is in the sidelink DRX sleep mode, a sidelink DRX end command to cause the other UE to terminate sidelink DRX operation of the other UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, to a base station (BS), a request for radio resources for transmitting a sidelink communication to another UE on a sidelink; and
   receiving, from the B S and based at least in part on transmitting the request for radio resources, an indication of a timing for retransmitting the request for radio resources to the BS,
   wherein the indication of the timing is based at least in part on the other UE being in a sidelink discontinuous reception sleep mode.

2. The method of claim 1, wherein the request for radio resources comprises a buffer status report associated with the UE.

3. The method of claim 1, wherein the indication of the timing is included in a medium access control element communication.

4. A method of wireless communication performed by a user equipment (UE), comprising:
   transmitting, to a base station (BS), a request to synchronize access link discontinuous reception (DRX) operation and sidelink DRX operation of the UE;
   receiving, from the B S and based at least in part on transmitting the request, an indication of an access link DRX configuration and a sidelink DRX configuration,
   wherein the access link DRX configuration and the sidelink DRX configuration synchronize access link DRX operation and sidelink DRX operation of the UE; and
   at least one of:
   performing access link communication with the BS based at least in part on the access link DRX configuration, or
   performing sidelink communication with another UE based at least in part on the sidelink DRX configuration.

5. The method of claim 4, wherein performing access link communication with the BS based at least in part on the access link DRX configuration comprises:
   remaining in an access link DRX on mode based at least in part on determining that the UE is in a sidelink DRX on mode.

6. The method of claim 4, wherein a sidelink DRX on mode duration, identified in the sidelink DRX configuration, and an access link DRX on mode duration, identified in the access link DRX configuration, are a same DRX on mode duration.

7. The method of claim 4, wherein a starting time of a sidelink DRX on mode, identified in the sidelink DRX configuration, and a starting time of an access link DRX on mode, identified in the access link DRX configuration, are a same DRX on mode starting time.

8. The method of claim 4, wherein a sidelink DRX cycle duration, identified in the sidelink DRX configuration, and an access link DRX cycle duration, identified in the access link DRX configuration, are a same DRX cycle duration.

9. The method of claim 4, wherein performing sidelink communication with another UE based at least in part on the sidelink DRX configuration comprises:
   remaining in a sidelink DRX on mode based at least in part on determining that the UE is in an access link DRX on mode.

10. The method of claim 9, wherein performing sidelink communication with another UE based at least in part on the sidelink DRX configuration comprises:
    transitioning from a sidelink DRX sleep mode to a sidelink DRX on mode based at least in part on transitioning from an access link DRX sleep mode to an access link DRX on mode.

11. The method of claim 4, wherein performing access link communication with the BS based at least in part on the access link DRX configuration comprises:
- transitioning from an access link DRX sleep mode to an access link DRX on mode based at least in part on transitioning from a sidelink DRX sleep mode to a sidelink DRX on mode.

12. The method of claim 4, wherein a starting time of a sidelink DRX on mode, identified in the sidelink DRX configuration, is based at least in part on a speed at which the UE is traveling.

13. The method of claim 4, wherein a sidelink DRX cycle duration, identified in the sidelink DRX configuration, is based at least in part on a speed at which the UE is traveling.

14. A method of wireless communication performed by a base station (BS), comprising:
- configuring an access link discontinuous reception (DRX) configuration and a sidelink DRX configuration for a user equipment (UE) such that the access link DRX configuration and the sidelink DRX configuration synchronize access link DRX operation and sidelink DRX operation of the UE; and
- transmitting an indication of the access link DRX configuration and the sidelink DRX configuration to the UE.

15. The method of claim 14, wherein a sidelink DRX on mode duration, identified in the sidelink DRX configuration, and an access link DRX on mode duration, identified in the access link DRX configuration, are a same DRX on mode duration.

16. The method of claim 14, wherein a starting time of a sidelink DRX on mode, identified in the sidelink DRX configuration, and a starting time of an access link DRX on mode, identified in the access link DRX configuration, are a same DRX on mode starting time.

17. The method of claim 14, wherein a sidelink DRX cycle duration, identified in the sidelink DRX configuration, and an access link DRX cycle duration, identified in the access link DRX configuration, are a same DRX cycle duration.

18. The method of claim 14, wherein a starting time of a sidelink DRX on mode, identified in the sidelink DRX configuration, is based at least in part on a speed at which the UE is traveling.

19. The method of claim 14, wherein a sidelink DRX cycle duration, identified in the sidelink DRX configuration, is based at least in part on a speed at which the UE is traveling.

20. The method of claim 14, further comprising:
- receiving, from the UE, a request for radio resources for transmitting a sidelink communication to another UE on a sidelink;
- determining that the other UE is in a sidelink DRX sleep mode; and
- transmitting, to the UE and based at least in part on determining that the other UE is in the sidelink DRX sleep mode, an indication of a timing for retransmitting the request for radio resources to the BS or an indication of a sidelink grant for a time period when the other UE is no longer in the sidelink DRX sleep mode.

21. The method of claim 20, wherein the request for radio resources comprises a buffer status report associated with the UE.

22. The method of claim 20, wherein the indication of the timing is included in a medium access control element communication.

23. The method of claim 20, wherein the indication of the sidelink grant is included in a downlink control information communication.

24. The method of claim 20, further comprising:
- transmitting, to the other UE and based at least in part on determining that the other UE is in the sidelink DRX sleep mode, a sidelink DRX end command to cause the other UE to terminate sidelink DRX operation of the other UE.

* * * * *